(12) United States Patent
Smith et al.

(10) Patent No.: US 8,532,490 B2
(45) Date of Patent: Sep. 10, 2013

(54) METHODS, SYSTEMS AND DEVICES FOR INTEGRATING WIRELESS TECHNOLOGY INTO A FIBER OPTIC NETWORK

(75) Inventors: Trevor D. Smith, Eden Prairie, MN (US); Yu Lu, Eden Prairie, MN (US); Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 193 days.

(21) Appl. No.: 12/718,818

(22) Filed: Mar. 5, 2010

(65) Prior Publication Data
US 2010/0226654 A1   Sep. 9, 2010

Related U.S. Application Data

(60) Provisional application No. 61/157,710, filed on Mar. 5, 2009.

(51) Int. Cl.
  *H04B 10/00*   (2013.01)
  *H04J 14/00*   (2006.01)
  *H04J 14/02*   (2006.01)

(52) U.S. Cl.
  CPC ................................. *H04J 14/0282* (2013.01)
  USPC ........................................... 398/72; 398/115

(58) Field of Classification Search
  USPC ............ 398/67–72, 118, 119, 125, 128, 135, 398/136, 138, 139, 173, 115, 116
  See application file for complete search history.

(56) References Cited

U.S. PATENT DOCUMENTS

| | | | |
|---|---|---|---|
| 4,365,865 A | 12/1982 | Stiles | |
| 4,420,220 A | 12/1983 | Dean et al. | |
| 4,497,537 A | 2/1985 | Dench | |
| 4,552,432 A | 11/1985 | Anderson et al. | |
| 4,695,127 A | 9/1987 | Ohlhaber et al. | |
| 4,723,832 A | 2/1988 | Okazato et al. | |
| 4,787,705 A | 11/1988 | Shinmoto et al. | |
| 4,867,527 A | 9/1989 | Dotti et al. | |
| 4,895,426 A | 1/1990 | Pinson | |
| 5,268,971 A | 12/1993 | Nilsson et al. | |
| 5,317,663 A | 5/1994 | Beard et al. | |
| 5,469,523 A | 11/1995 | Blew et al. | |

(Continued)

FOREIGN PATENT DOCUMENTS
WO   WO 2007/062606 A1   6/2007

OTHER PUBLICATIONS
International Search Report and Written Opinion mailed Sep. 27, 2010.

(Continued)

*Primary Examiner* — Dalzid Singh
(74) *Attorney, Agent, or Firm* — Merchant & Gould P.C.

(57) ABSTRACT

The present disclosure relates to a fiber optic network configuration having an optical network terminal located at a subscriber location. The fiber optic network configuration also includes a drop terminal located outside the subscriber location and a wireless transceiver located outside the subscriber location. The fiber optic network further includes a cabling arrangement including a first signal line that extends from the drop terminal to the optical network terminal, a second signal line that extends from the optical network terminal to the wireless transceiver, and a power line that extends from the optical network terminal to the wireless transceiver.

14 Claims, 19 Drawing Sheets

(56) References Cited

U.S. PATENT DOCUMENTS

| | | | |
|---|---|---|---|
| 5,539,851 | A | 7/1996 | Taylor et al. |
| 5,555,336 | A | 9/1996 | Winslow |
| 5,555,338 | A | 9/1996 | Haag et al. |
| 5,557,698 | A | 9/1996 | Gareis et al. |
| 5,651,081 | A | 7/1997 | Blew et al. |
| 5,677,974 | A | 10/1997 | Elms et al. |
| 5,699,176 | A * | 12/1997 | Cohen ............... 398/66 |
| 5,745,627 | A | 4/1998 | Arroyo et al. |
| 5,778,122 | A | 7/1998 | Giebel et al. |
| 5,864,672 | A * | 1/1999 | Bodeep et al. .......... 725/126 |
| 5,880,865 | A * | 3/1999 | Lu et al. ............ 398/72 |
| 5,913,003 | A | 6/1999 | Arroyo et al. |
| 6,169,834 | B1 | 1/2001 | Keller |
| 6,195,487 | B1 | 2/2001 | Anderson et al. |
| 6,236,789 | B1 | 5/2001 | Fitz |
| 6,343,172 | B1 | 1/2002 | Schiestle et al. |
| 6,363,192 | B1 | 3/2002 | Spooner |
| 6,463,198 | B1 | 10/2002 | Coleman et al. |
| 6,546,175 | B1 | 4/2003 | Wagman et al. |
| 6,567,592 | B1 | 5/2003 | Gimblet et al. |
| 6,599,025 | B1 | 7/2003 | Deutsch |
| 6,674,966 | B1 * | 1/2004 | Koonen ............... 398/70 |
| 6,687,437 | B1 | 2/2004 | Starnes et al. |
| 6,714,710 | B2 | 3/2004 | Gimblet |
| 6,719,461 | B2 | 4/2004 | Cull |
| 6,738,547 | B2 | 5/2004 | Spooner |
| 6,755,575 | B2 | 6/2004 | Kronlund et al. |
| 6,758,693 | B2 | 7/2004 | Inagaki et al. |
| 6,785,450 | B2 | 8/2004 | Wagman et al. |
| 6,847,767 | B2 | 1/2005 | Hurley et al. |
| 6,895,185 | B1 * | 5/2005 | Chung et al. ............ 398/72 |
| 6,899,467 | B2 | 5/2005 | McDonald et al. |
| 6,931,183 | B2 | 8/2005 | Panak et al. |
| 6,965,718 | B2 | 11/2005 | Koertel |
| 6,983,095 | B2 | 1/2006 | Reagan et al. |
| 7,006,740 | B1 | 2/2006 | Parris |
| 7,035,513 | B2 | 4/2006 | Mohler et al. |
| 7,090,406 | B2 | 8/2006 | Melton et al. |
| 7,090,407 | B2 | 8/2006 | Melton et al. |
| 7,111,990 | B2 | 9/2006 | Melton et al. |
| 7,113,679 | B2 | 9/2006 | Melton et al. |
| 7,120,347 | B2 | 10/2006 | Blackwell, Jr. et al. |
| 7,158,703 | B2 | 1/2007 | Mjelstad |
| 7,198,409 | B2 | 4/2007 | Smith et al. |
| 7,233,731 | B2 | 6/2007 | Solheid et al. |
| 7,272,281 | B2 | 9/2007 | Stahulak et al. |
| 7,292,763 | B2 | 11/2007 | Smith et al. |
| 7,310,430 | B1 | 12/2007 | Mallya et al. |
| 7,349,605 | B2 | 3/2008 | Noonan et al. |
| 7,362,936 | B2 | 4/2008 | Stark et al. |
| 7,371,014 | B2 | 5/2008 | Willis et al. |
| 7,397,997 | B2 | 7/2008 | Ferris et al. |
| 7,400,815 | B2 | 7/2008 | Mertesdorf et al. |
| 7,401,985 | B2 | 7/2008 | Aronson et al. |
| 7,418,181 | B2 | 8/2008 | Zimmel et al. |
| 7,445,389 | B2 | 11/2008 | Aronson |
| 7,489,849 | B2 | 2/2009 | Reagan et al. |
| 7,494,287 | B2 | 2/2009 | Wang et al. |
| 7,499,616 | B2 | 3/2009 | Aronson et al. |
| 7,565,055 | B2 | 7/2009 | Lu et al. |
| 7,572,065 | B2 | 8/2009 | Lu et al. |
| 7,591,595 | B2 | 9/2009 | Lu et al. |
| 7,627,222 | B2 | 12/2009 | Reagan et al. |
| 7,643,713 | B2 | 1/2010 | Buthe et al. |
| 7,680,388 | B2 | 3/2010 | Reagan et al. |
| 7,692,098 | B2 | 4/2010 | Wyatt, II et al. |
| 7,712,976 | B2 | 5/2010 | Aronson et al. |
| 7,720,343 | B2 | 5/2010 | Barth et al. |
| 7,744,288 | B2 | 6/2010 | Lu et al. |
| 7,751,672 | B2 | 7/2010 | Smith et al. |
| 7,762,727 | B2 | 7/2010 | Aronson |
| 7,778,510 | B2 | 8/2010 | Aronson et al. |
| 7,816,602 | B2 | 10/2010 | Landry et al. |
| 7,844,158 | B2 | 11/2010 | Gronvall et al. |
| 7,869,681 | B2 | 1/2011 | Battey et al. |
| 7,873,255 | B2 | 1/2011 | Reagan et al. |
| 7,876,989 | B2 | 1/2011 | Aronson et al. |
| 7,897,873 | B2 | 3/2011 | Gemme et al. |
| 8,041,178 | B2 | 10/2011 | Lu et al. |
| 8,083,417 | B2 | 12/2011 | Aronson et al. |
| 8,155,525 | B2 | 4/2012 | Cox |
| 8,175,433 | B2 | 5/2012 | Caldwell et al. |
| 8,204,348 | B2 | 6/2012 | Keller et al. |
| 8,244,087 | B2 | 8/2012 | Sales Casals et al. |
| 8,249,410 | B2 | 8/2012 | Andrus et al. |
| 8,254,740 | B2 | 8/2012 | Smith et al. |
| 8,270,838 | B2 | 9/2012 | Cox |
| 8,297,854 | B2 | 10/2012 | Bickham et al. |
| 8,301,003 | B2 | 10/2012 | de los Santos Campos et al. |
| 8,328,433 | B2 | 12/2012 | Furuyama |
| 2002/0136510 | A1 | 9/2002 | Heinz et al. |
| 2003/0215197 | A1 | 11/2003 | Simon et al. |
| 2005/0172328 | A1 | 8/2005 | Park et al. |
| 2006/0291787 | A1 | 12/2006 | Seddon |
| 2007/0065089 | A1 | 3/2007 | Matsuoka et al. |
| 2007/0110026 | A1 * | 5/2007 | Sinha et al. ............ 370/351 |
| 2007/0269170 | A1 | 11/2007 | Easton et al. |
| 2008/0025725 | A1 | 1/2008 | Jette et al. |
| 2008/0037941 | A1 | 2/2008 | Mallya et al. |
| 2008/0159744 | A1 * | 7/2008 | Soto et al. ............ 398/115 |
| 2009/0060531 | A1 * | 3/2009 | Biegert et al. ............ 398/214 |
| 2009/0162016 | A1 | 6/2009 | Lu et al. |
| 2009/0317047 | A1 | 12/2009 | Smith et al. |
| 2010/0014868 | A1 | 1/2010 | McGlynn et al. |
| 2010/0200270 | A1 | 8/2010 | Gemme et al. |
| 2011/0280527 | A1 | 11/2011 | Tamura |
| 2011/0293227 | A1 | 12/2011 | Wu |
| 2011/0311191 | A1 | 12/2011 | Hayashishita et al. |
| 2012/0008904 | A1 | 1/2012 | Han et al. |
| 2012/0008905 | A1 | 1/2012 | Han et al. |
| 2012/0008906 | A1 | 1/2012 | Han et al. |
| 2012/0057821 | A1 | 3/2012 | Aronson et al. |
| 2012/0080225 | A1 | 4/2012 | Kim et al. |
| 2012/0114288 | A1 | 5/2012 | Wu |
| 2012/0191997 | A1 | 7/2012 | Miller |
| 2012/0281952 | A1 | 11/2012 | McColloch |
| 2012/0281953 | A1 | 11/2012 | Choi et al. |
| 2012/0288245 | A1 | 11/2012 | Hurley et al. |
| 2013/0011106 | A1 | 1/2013 | Congdon, II et al. |
| 2013/0022318 | A1 | 1/2013 | Fingler et al. |

OTHER PUBLICATIONS

Above Ground Level (AGL) magazine; dated Jul. 2006 (vol. 3, No. 4) and Aug./Sep. 2006 (vol. 3, No. 5); pp. 1-8.

Broadband Properties *You Don't Know Jack?*; dated Jun. 2005; pp. 26-29.

Corning Cable Systems Evolant® *Solutions for Wireless Networks*; dated Sep. 2006; pp. 1-6.

Wikipedia *Network Operations Center*; dated Apr. 23, 2008; pp. 1-2.

Wikipedia "local loop"; dated Apr. 16, 2008; pp. 1-2.

Webopedia "CO"; dated Apr. 23, 2008; pp. 1-4.

Wikipedia "Fiber to the x (FTTX)"; Dated Apr. 15, 2008; pp. 1-4.

Wikipedia "Fiber to the premises (FTTP)"; dated Apr. 15, 2008; pp. 1-4.

Wikipedia "Wireless local loop (WLL)"; dated Apr. 16, 2008; pp. 1-6.

Wikipedia "Voice over Internet Protocol (VoIP)"; dated Apr. 18, 2008; pp. 1-14.

Wikipedia "Local-Area Network"; dated Apr. 18, 2008; pp. 1-3.

\* cited by examiner

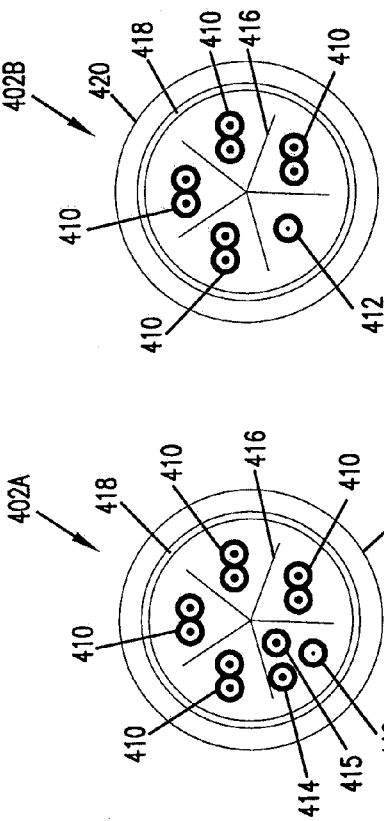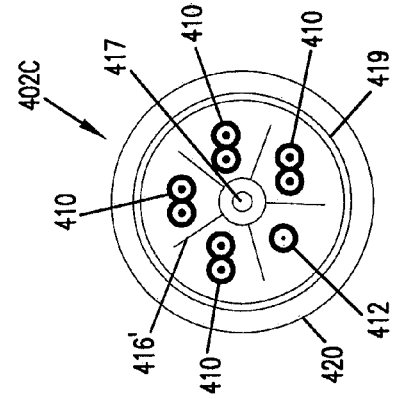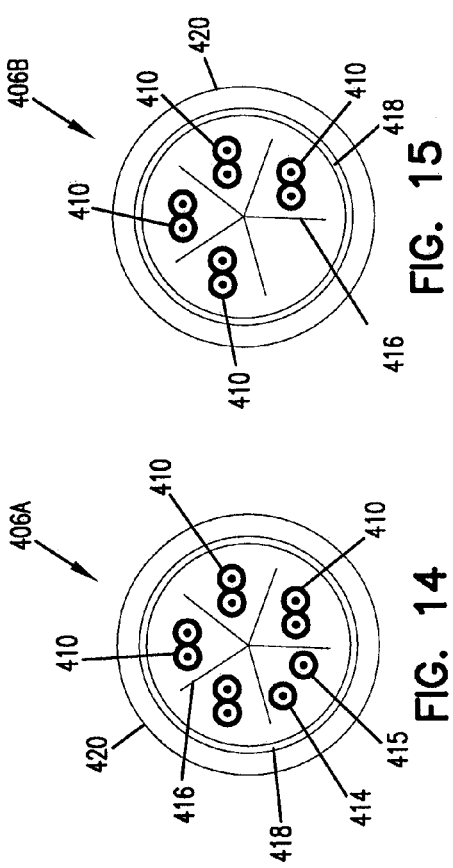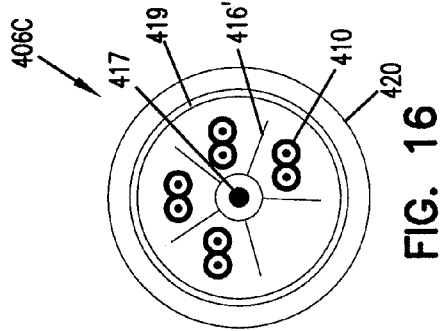

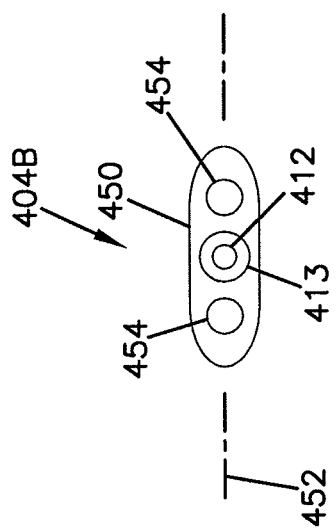
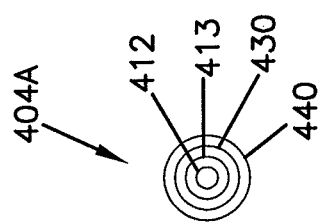

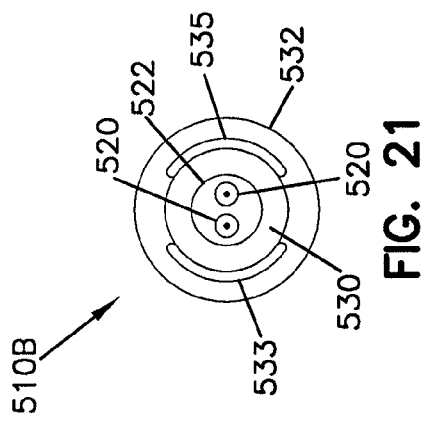
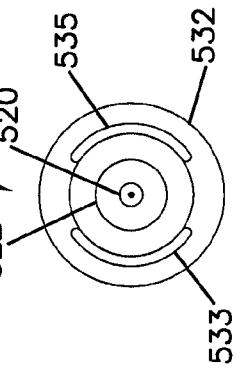
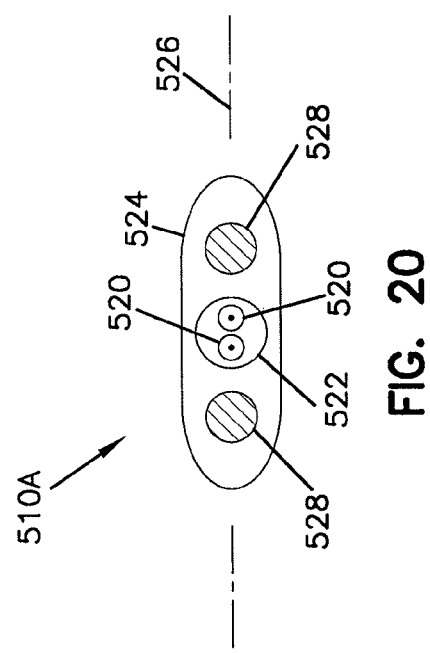
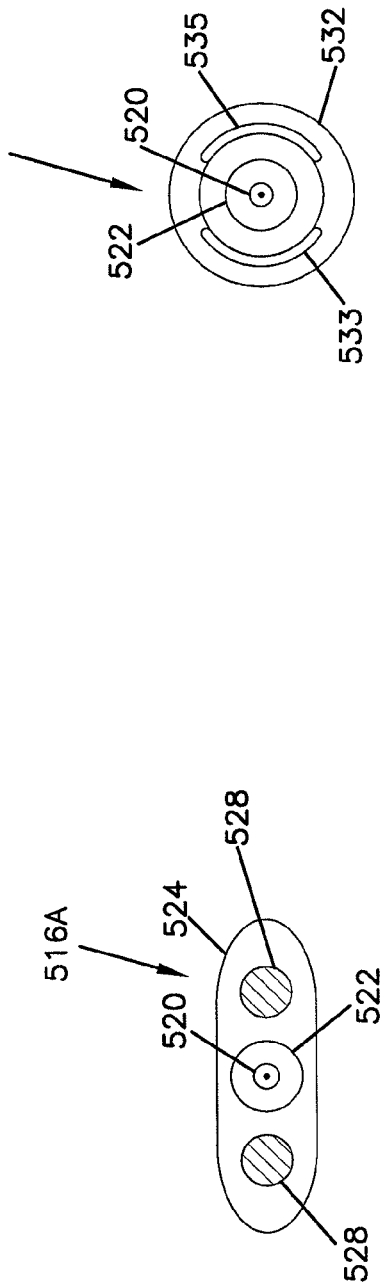

METHODS, SYSTEMS AND DEVICES FOR INTEGRATING WIRELESS TECHNOLOGY INTO A FIBER OPTIC NETWORK

CROSS REFERENCE TO RELATED APPLICATION

This application claims the benefit of U.S. Provisional Patent Application Ser. No. 61/157,710, filed Mar. 5, 2009, which application is hereby incorporated by reference in its entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals in one direction and convert electrical signals to optical signals in the opposite direction. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into electrical signals for use with the subscriber's devices. However, to the extent that an end user may have devices that are compatible with optical signals, conversion of the optical signals to electrical signals may not be necessary.

FTTP networks include active optical networks and passive optical networks. Active optical networks use electrically powered equipment (e.g., switches, routers, multiplexers or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

SUMMARY

Features of the present disclosure relate to methods, systems and devices for incorporating or integrating wireless technology into a fiber optic distribution network. In one embodiment, wireless technology is incorporated into an FTTP network.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIG. 11 is a cross-sectional view taken along section line 11-11 of FIG. 10 showing an example trunk section that can be used in the cable configuration of FIG. 10;

FIG. 12 is a cross-sectional view taken along section line 11-11 of FIG. 10 showing an alternative trunk section for the cable configuration of FIG. 10;

FIG. 13 is a cross-sectional view taken along section line 11-11 of FIG. 10 showing another trunk section that can be used with the cable configuration of FIG. 10;

FIG. 14 is a cross-sectional view taken along section line 14-14 of FIG. 10 showing an example branch section for the cable configuration of FIG. 10;

FIG. 15 is a cross-sectional view taken along section line 14-14 of FIG. 10 showing an alternative branch section for the cable configuration of FIG. 10;

FIG. 16 is a cross-sectional view taken along section line 14-14 of FIG. 10 showing still another branch section that can be used with the cable configuration of FIG. 10;

FIG. 17 is a cross-sectional view taken along section line 17-17 of FIG. 10 showing another branch section for the cable configuration of FIG. 10;

FIG. 18 is a cross-sectional view taken along section line 17-17 of FIG. 10 showing a further branch section that can be used for the cable configuration of FIG. 10;

FIG. 20 is a cross-sectional view taken along section line 20-20 of FIG. 19 showing an example cable arrangement for a trunk section of the cable configuration of FIG. 15;

FIG. 21 is a cross-sectional view taken along section line 20-20 of FIG. 19 showing an alternative trunk section for the cable configuration of FIG. 19;

FIG. 22 is a cross-sectional view taken along section line 22-22 of FIG. 19 showing an example branch cable arrangement for the cable configuration of FIG. 19;

FIG. 23 is a cross-sectional view taken along section line 19-19 showing an alternative branch cable configuration that can be used for the cable configuration of FIG. 19;

DETAILED DESCRIPTION

A. Example Network

Figure 1:
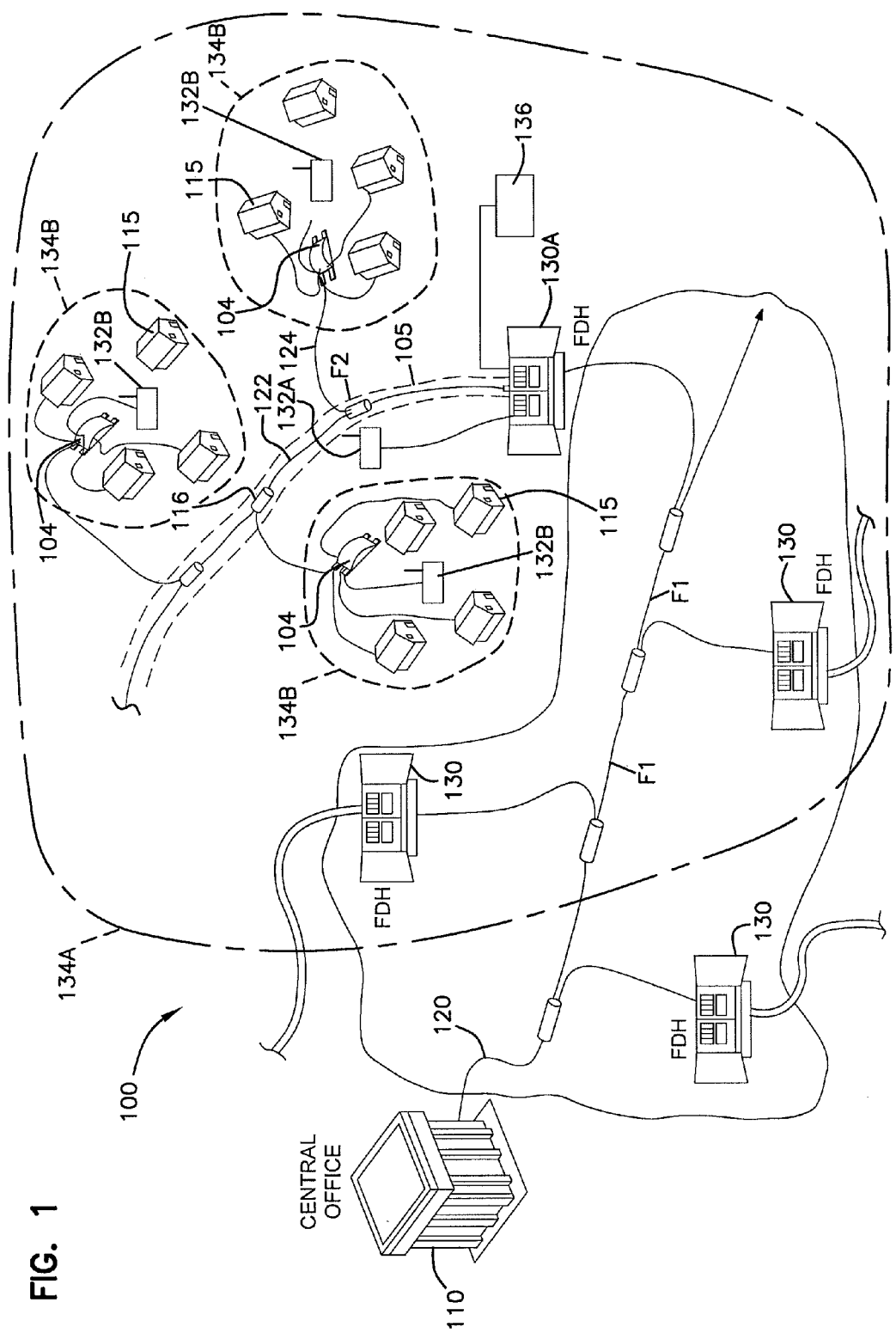
FIG. 1 is a schematic view of a fiber optic network in accordance with the principles of the present disclosure.

FIG. 1 illustrates an exemplary passive optical network 100. As shown in FIG. 1, the network 100 is adapted to interconnect a central office 110 to a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105).

In general, the network 100 includes feeder distribution cables 120 routed from the central office 110. The feeder distribution cables 120 often include a main cable or trunk, and a plurality of branch cables that branch from the main cable. The portion of network 100 that is closest to central office 110 is generally referred to as the F1 region. The F1 region of the network may include a feeder cable (i.e., an F1 distribution cable) having on the order of 12 to 48 fibers; however, alternative implementations may include fewer or more fibers. The network 100 also has an F2 region that includes cables and components located in closer proximity to the subscribers/end users 115.

The network 100 also may include fiber distribution hubs (FDHs) 130 that receive branch cables of the feeder distribution cable 120 and that output one or more F2 distribution cables 122. In general, an FDH 130 is an equipment enclosure that may include a plurality of passive optical splitters (e.g., 1-to-8 splitters, 1-to-16 splitters, or 1-to-32 splitters) for splitting the incoming feeder fibers into a number (e.g., 216, 432, etc.) of output distribution fibers corresponding to optical fibers of the F2 distribution cables 122. The F2 distribution cables are routed from the FDH 130 to locations in close proximity to the end users 115.

The F2 distribution cables 122 can have a variety of different type of configurations. As depicted at FIG. 1, the F2 distribution cables include a plurality of breakout locations 116 at which branch cables (e.g., drop cables, stub cables, etc.) are separated out from and optically coupled to trunks of the distribution cables 122. Breakout locations 116 also can be referred to as tap locations or branch locations and branch cables also can be referred to as breakout cables or tethers. At a breakout location, fibers of the trunk of the distribution cable can be broken out and connectorized to form a connectorized tether. In other embodiments, fibers of the trunk can be broken out and spliced to a length of optical fiber having a connectorized free end so as to form a connectorized tether.

Stub cables are typically branch cables that are routed from breakout locations 116 to intermediate access locations, such as a pedestals, drop terminals 104 or hubs. Intermediate access locations can provide connector interfaces located between breakout locations 116 and the subscriber locations 115. A drop cable is a cable that typically forms the last leg to a subscriber location 115. For example, drop cables can be routed from intermediate access locations to subscriber locations 115. Drop cables also can be routed directly from breakout locations 116 to subscriber locations 115, thereby bypassing any intermediate access locations.

In other embodiments, F2 distribution cable may not employ breakouts. Instead, an F2 distribution cable may be run from an FDH to a drop terminal such that one end of the F2 distribution cable is located at the FDH and the other end of the F2 distribution cable is located at the drop terminal. For such an embodiment, the F2 distribution cable may include the same number of optical fibers as the number of access ports provided on the drop terminal. For such an embodiment, an excess length of the F2 distribution cable can be stored on a spool provided at the drop terminal as described at U.S. Patent Application Ser. No. 61/098,494, which is hereby incorporated by reference.

FIG. 1 shows the network after installation of the distribution cables and drop terminals, but before installation of drop cables. Upon completion of the network, drop cables will typically be installed to form the final legs between the subscribers 115 and the intermediate locations (e.g., drop terminals 104) or between the subscribers 115 and the break out locations 116.

Referring still to FIG. 1, the depicted network is configured to allow service to be distributed to the network via wireless transmissions as well as hard connections (i.e., connections made to the network through a direct physical connection such as a co-axial cable, twisted pair cable, fiber optic cable or other type of cable). Wireless transmissions allow service to be provided to subscribers that are not hard connected to the network and also allow redundant service to be provided to subscribers that are hard connected to the network. As shown at FIG. 1, a wireless transceiver 132A is installed adjacent FDH 130A. The wireless transceiver 132A can be mounted inside the enclosure of the FDH 130A, or can be outside the enclosure of the FDH 130A. The wireless transceiver 132A has a coverage area 134A large enough to cover at least the portion of the network to which the FDH 130A provides hard service connections. In certain embodiments, the wireless transceiver 132A has a coverage area larger than the portion of the network to which the FDH 130A provides hard service connections. Power for the wireless transceiver 132A can be provided from a number of sources. For example, power can be metered from an adjacent utility. Alternatively, power can be provided by a battery located at or near the FDH 130A. Further, power can be provided by a solar panel 136 positioned on, at, or near the FDH 130A. In certain embodiments, the solar panel 136 can be used to re-charge a battery within the FDH enclosure that provides power to the wireless transceiver 132A.

Referring again to FIG. 1, wireless transceivers 132B are also mounted at or near the drop terminals 104 of the network. The wireless transceivers 132B have coverage areas 134B smaller than the coverage area 134A of the wireless transceiver 132A. The coverage areas 134B are shown within the coverage area 134A and each coverage area 134B corresponds in size generally with the portion of the network to which it corresponding drop terminals 104 is intended to provide hard service connections.

It will be appreciated that the wireless transceivers 132B include components for converting optical signals and/or electrical signals to wireless signals. The wireless transceivers 132B further includes components for transmitting the wireless signals to a predetermined transmission area, and for receiving wireless signals transmitted from transmitters within the wireless service area. The wireless transceiver can also include multiplexers or other equipment.

B. Example Fiber Distribution Hub

Figure 2:
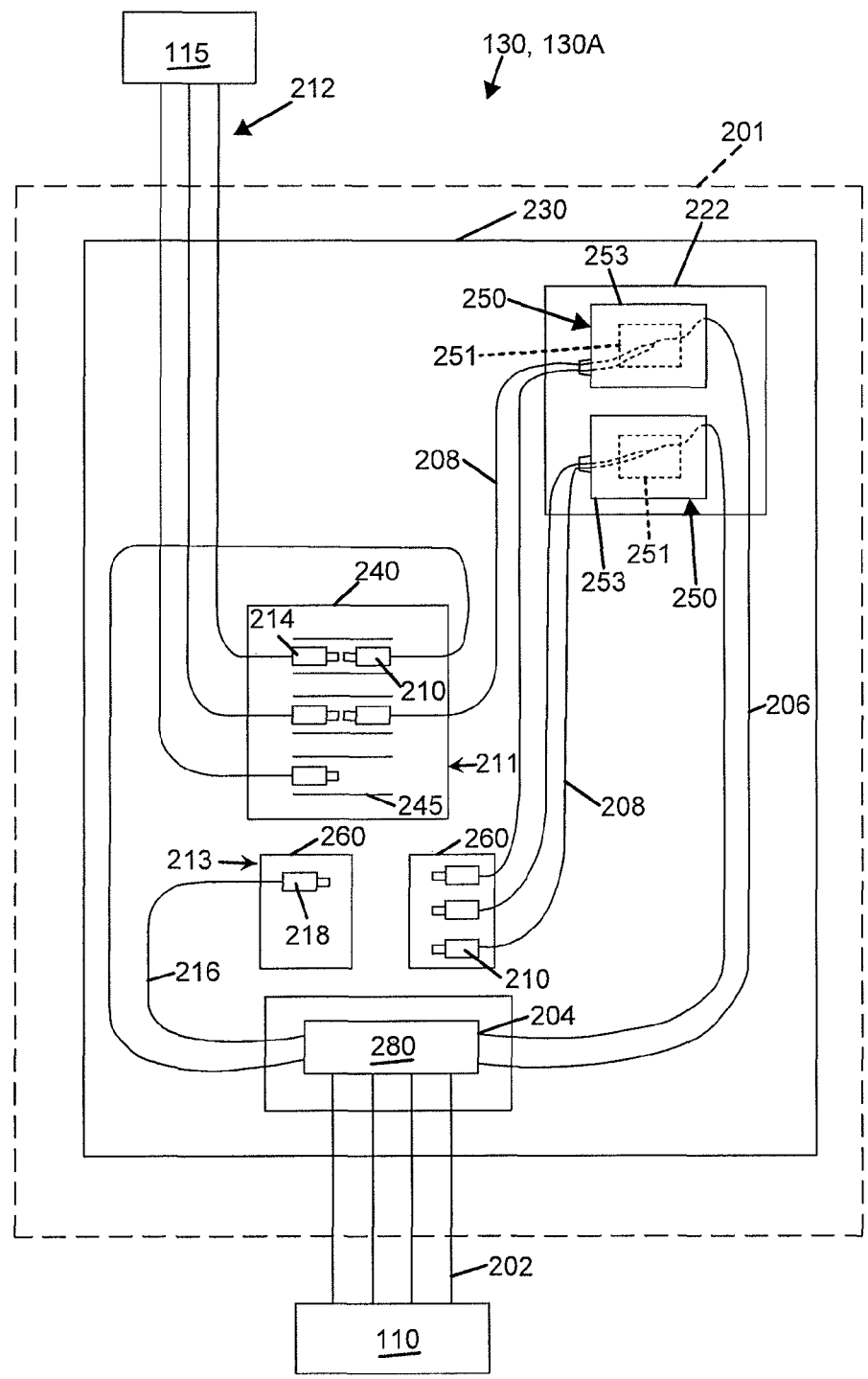
FIG. 2 is a schematic drawing of an example fiber distribution hub that can be used in the fiber optic network of FIG. 1.
Figure 3:
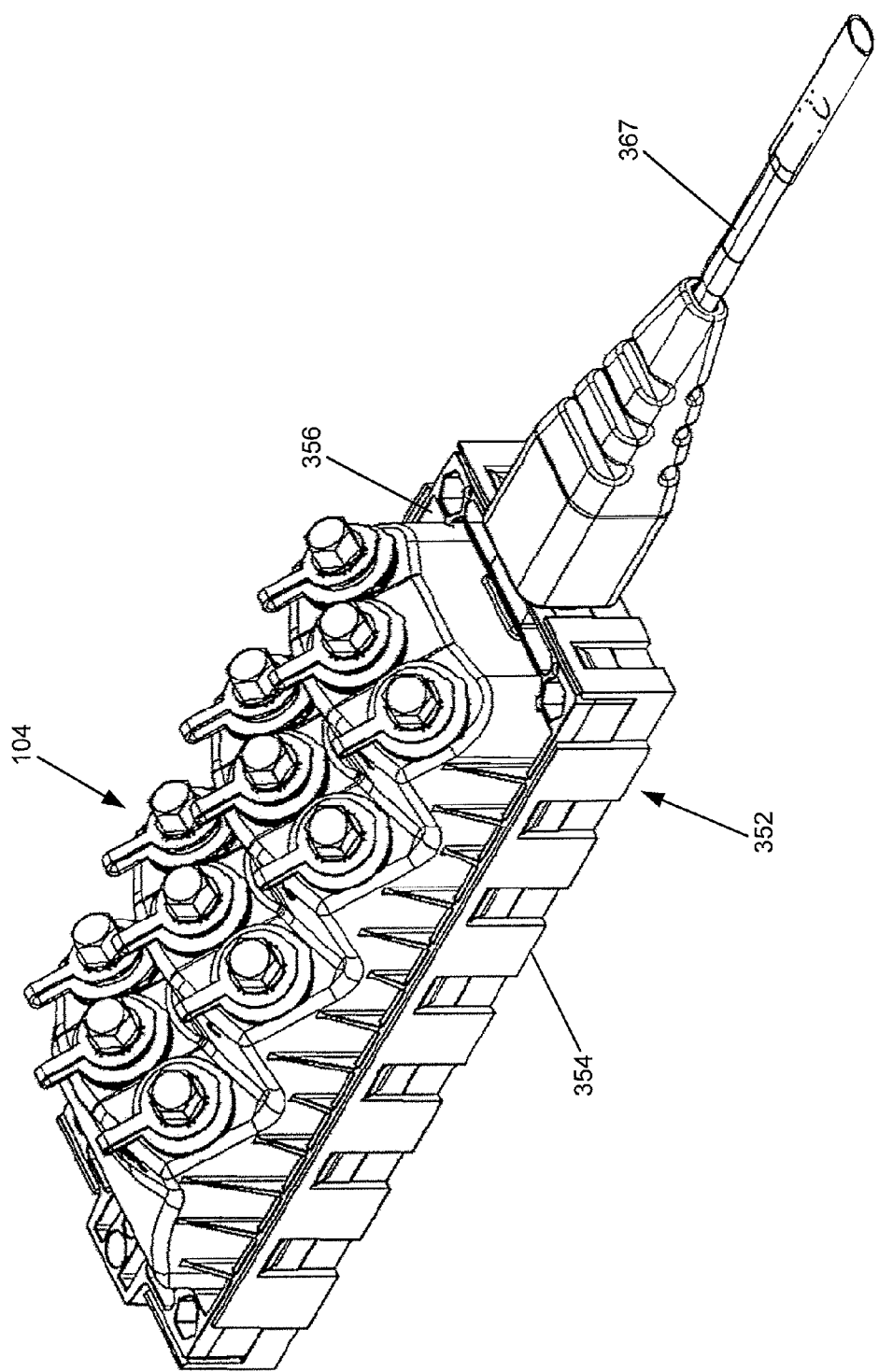
FIG. 3 is a front, bottom perspective view of a drop terminal that can be used in the fiber optic network of FIG. 1.
Figure 4:
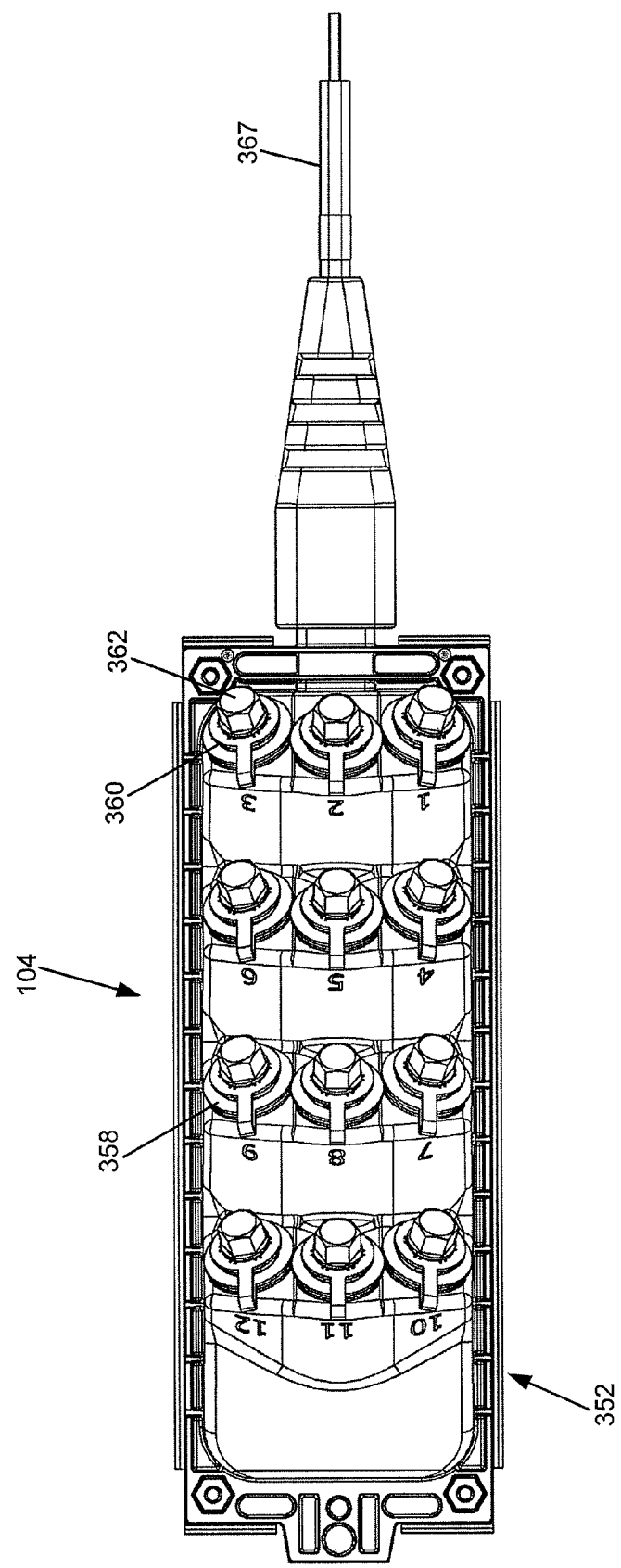
FIG. 4 is a front view of the drop terminal of FIG. 3.
Figure 5:
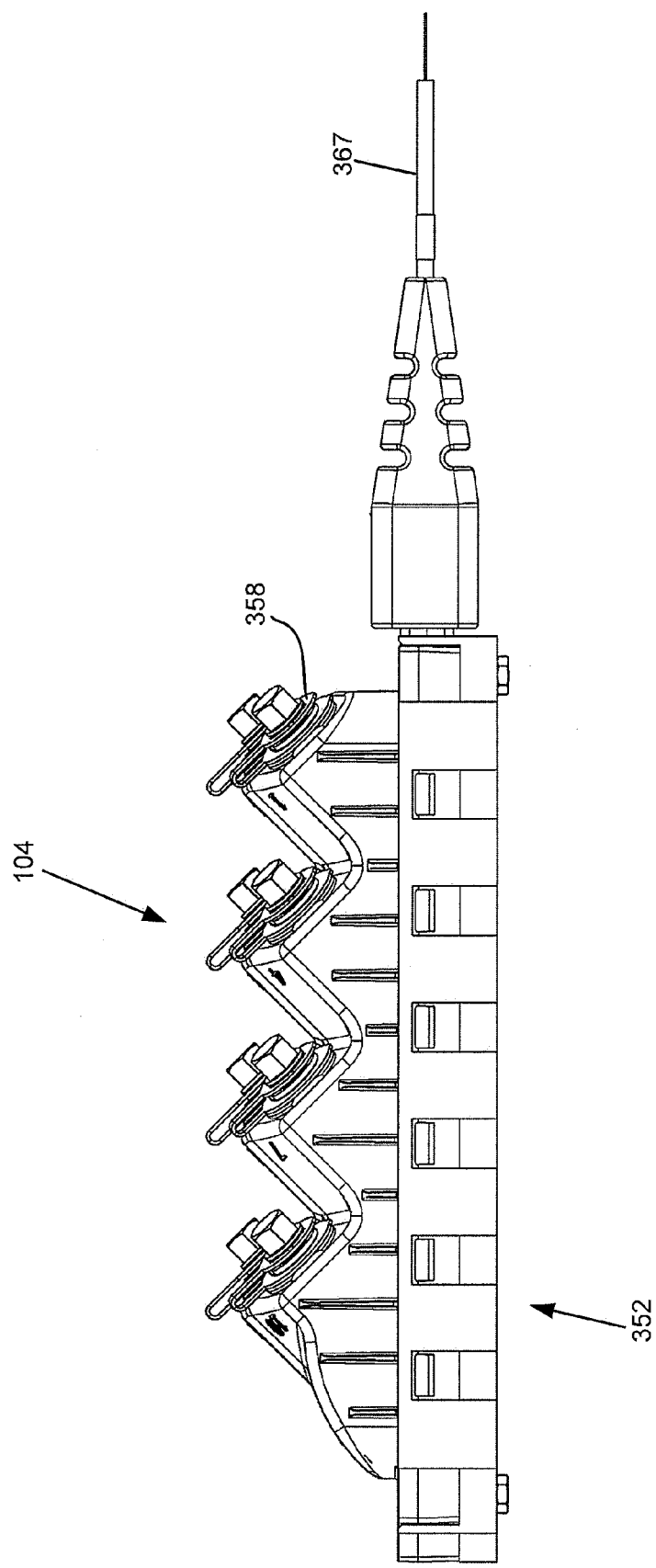
FIG. 5 is a side view of the drop terminal of FIG. 3.
Figure 6:
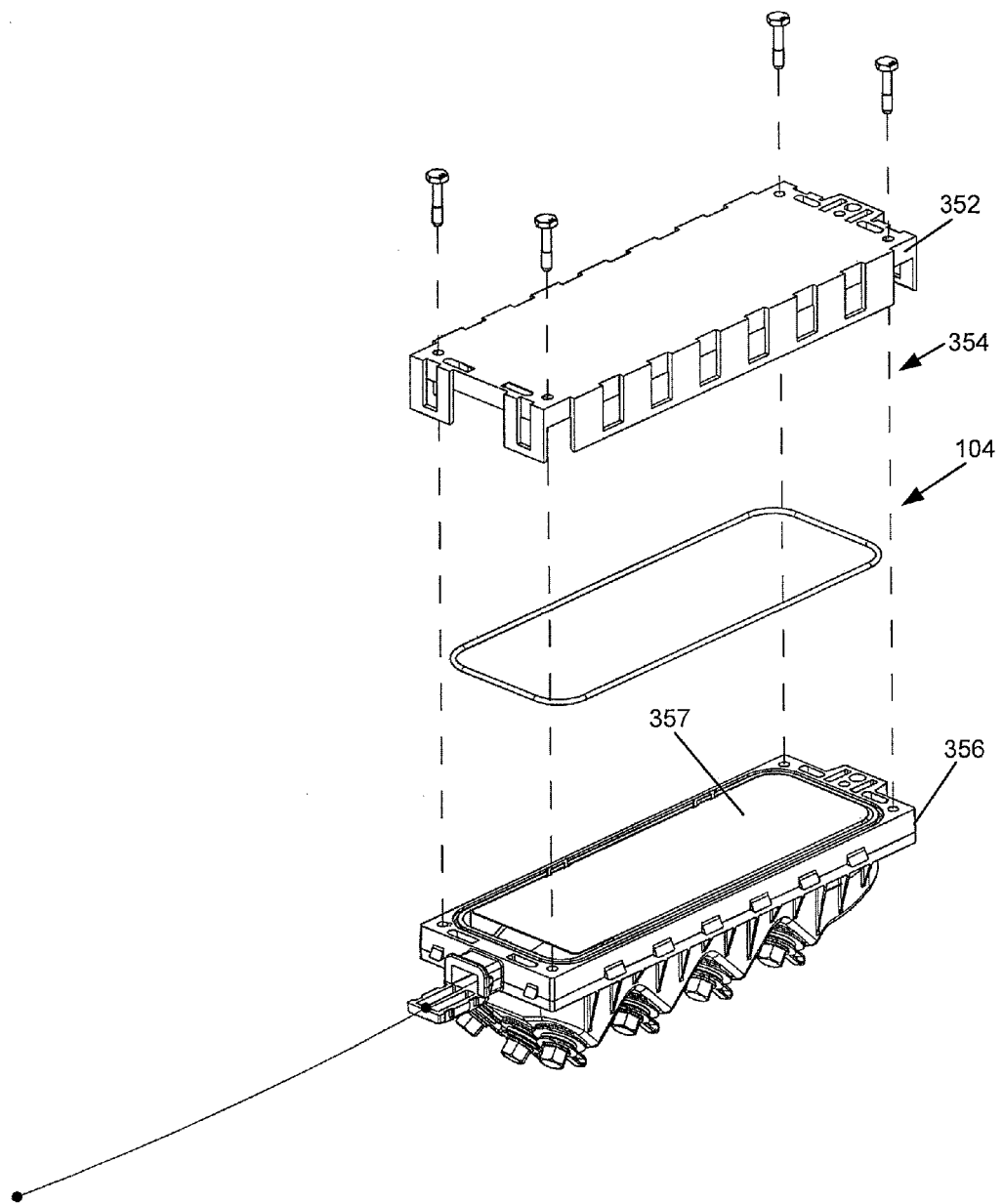
FIG. 6 is an exploded, perspective view of the drop terminal of FIG. 3.
Figure 7:
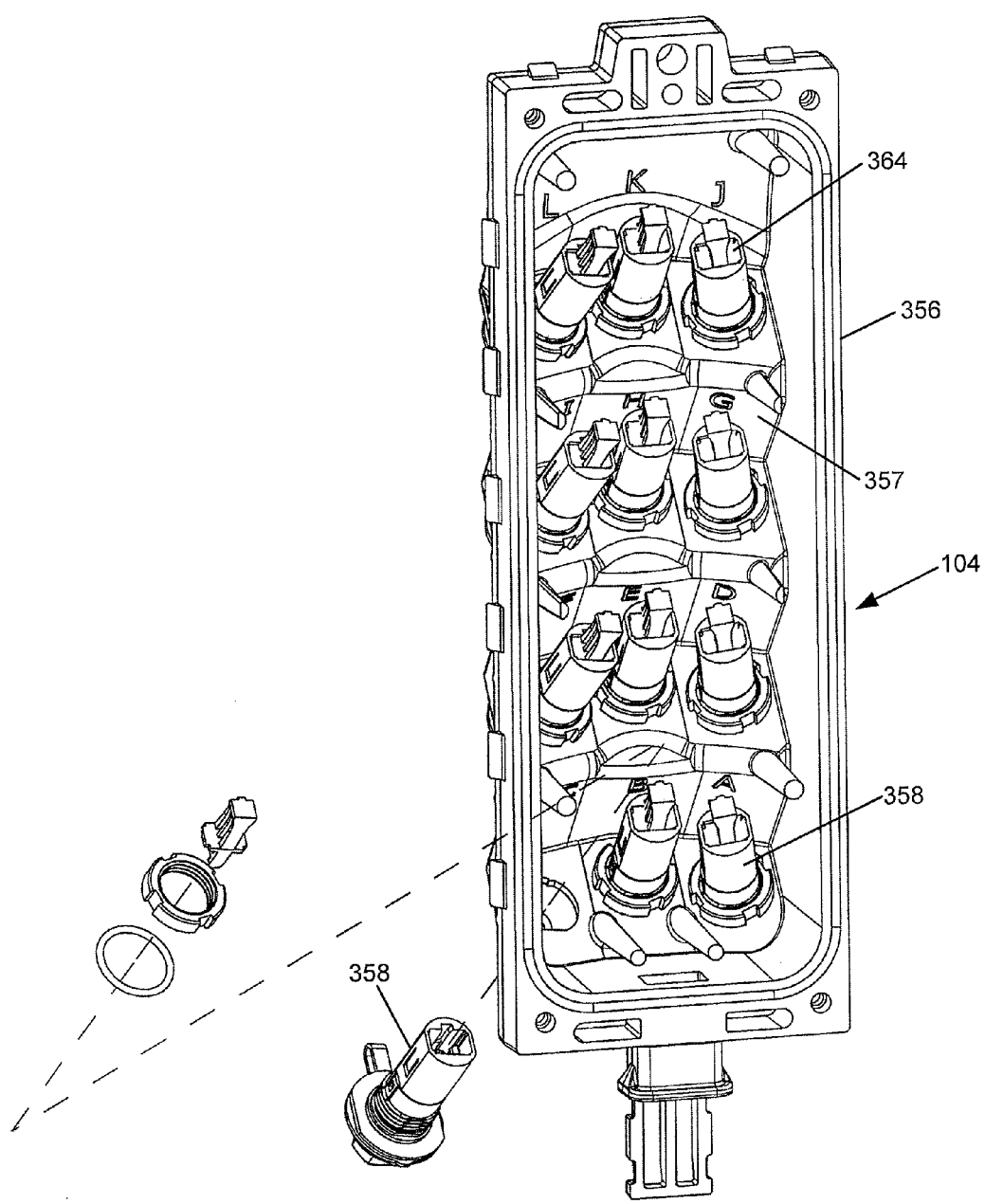
FIG. 7 is a view showing the interior of a front piece of the drop terminal of FIG. 3.
Figure 8:
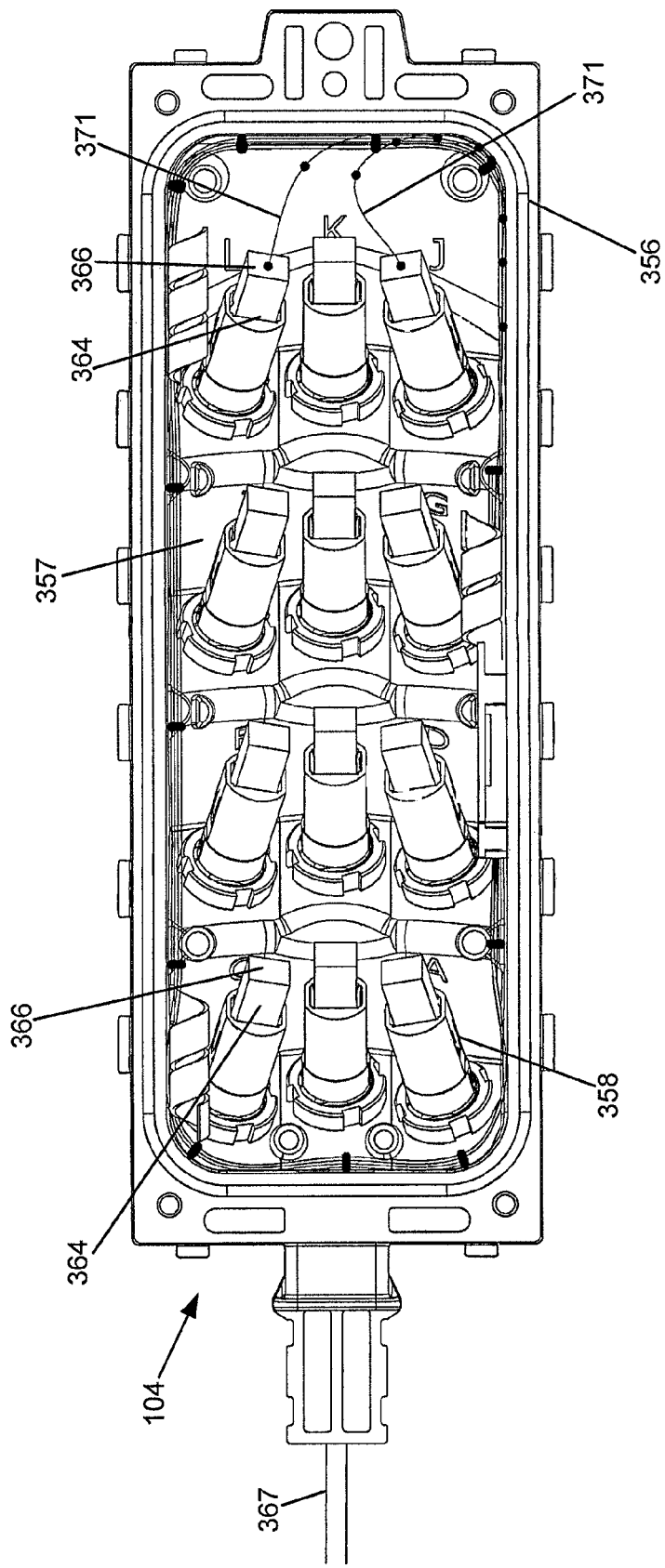
FIG. 8 is another view showing the interior of the front piece of the drop terminal of FIG. 3.

FIG. 2 is a schematic diagram showing an example lay out that can be used for the FDHs 130, 130A in the network of FIG. 1. Each FDH 130, 130A generally administers connections at a termination region 211 between incoming fibers and outgoing fibers in an Outside Plant (OSP) environment. As the term is used herein, "a connection" between fibers includes both direct and indirect connections. Examples of incoming fibers include fibers from a feeder cable 202 that enter the FDH 130, 130A and intermediate fibers (e.g., connectorized pigtails 208 extending from splitters 250 and patching fibers/jumpers) that connect the fibers of the feeder cable 202 to the termination region 211. Examples of outgoing fibers include fibers of a subscriber cable 212 (e.g., fibers of F2 distribution cables) that exit the FDH 130, 130A and any intermediate fibers that connect the fibers of the subscriber cable 212 fibers to the termination region 211. The FDH 130, 130A provides an interconnect interface for optical transmission signals at a location in the network where operational access and reconfiguration are desired. For example, the FDH 130, 130A can be used to split the signals from the feeder cables 202 and direct the split signals to the fiber of the distribution cables 212 routed to subscriber locations 115. In addition, the FDH 130, 130A is designed to accommodate a range of alternative sizes and fiber counts and support factory installation of pigtails 208, fanouts, and splitter modules 250.

As shown at FIG. 2, the feeder cable 202 is initially routed into the example FDH 130 through an enclosure/cabinet 201 (e.g., typically through the back or bottom of the cabinet 201). In certain embodiments, the fibers of the feeder cable 202 can include ribbon fibers. An example feeder cable 202 may include twelve to forty-eight individual fibers connected to the service provider's central office 110. In certain embodiments, after entering the cabinet 201, the fibers of the feeder cable 202 are routed to a feeder cable interface 280 (e.g., fiber optic adapter modules, a splice tray, etc.). At the feeder cable interface 280, one or more of the fibers of the feeder cable 202 are individually connected to ends 204 of separate splitter input fibers 206. The splitter input fibers 206 are routed from the feeder cable interface 280 to a splitter mounting location 222 at which a plurality of the splitter modules 250 can be mounted. In certain embodiments, the feeder cable interface 280 can be located at the splitter mounting location 222 such that the splitter modules plug directly into the feeder cable interface (e.g., see U.S. Pat. No. 7,418,181 that is hereby incorporated by reference). Each splitter module 250 includes at least one fiber optic splitter 251 positioned within a splitter housing 253. At the splitter mounting location 222, the splitter input fibers 206 are optically connected to separate splitter modules 250, wherein the input fibers 206 are each split by the fiber optic splitters 251 of the splitter modules 250 into multiple pigtails 208, each having a connectorized end 210. The termination region 211, the splitter mounting region 222, storage region 213 and the feeder cable interface 280 can all be mounted on a swing frame/chassis 230 mounted within the cabinet 201. The chassis 230 is pivotally movable relative to the cabinet 201 between a stowed position in which the chassis 230 is fully within the cabinet 201 and an access position in which the chassis 230 projects at least partially outside the cabinet 201. The pivotal configuration of the chassis 230 allows the various components carried by the chassis 230 to be more easily accessed.

When the pigtails 208 are not in service, the connectorized ends 210 can be temporarily stored on a storage module 260 that is mounted at the storage region 213 of the swing frame 230. When the pigtails 208 are needed for service, the pigtails 208 are routed from the splitter modules 250 to a termination module 240 that is provided at the termination region 211 of the swing frame 230. At the termination module 240, the connectorized ends 210 of the pigtails 208 are connected to connectorized ends 214 of the fibers of the distribution cable 212 by fiber optic adapters 245. The termination region 211 is the dividing line between the incoming fibers and the outgoing fibers. A typical distribution cable 212 forms the F2 portion of a network (see FIG. 1) and typically includes a plurality of fibers (e.g., 144, 216 or 432 fibers) that are routed from the FDH 130, 130A to subscriber locations 115. Example FDHs are disclosed at U.S. patent application Ser. Nos. 11/544,951, now U.S. Patent Application Pub. No. 2007/0192817, and now U.S. Pat. No. 7,816,602, and Ser. No. 12/241,576, now U.S. Pat. No. 7,751,672, that are hereby incorporated by reference.

The splitter modules 250 and storage modules 260 can be incrementally added to the swing frame 230. The connectorized pigtails 208 are typically stored in one or more of the storage modules 260 prior to installation on the swing frame 230. In certain embodiments, the connectorized end 210 of each pigtail 208 is secured in one of the storage modules 260 before the splitter module 250 leaves the factory.

C. Example Drop Terminal

FIGS. 3-8 show an example configuration for the drop terminals 104 used in the network of FIG. 1. The drop terminal configuration includes a housing 352 having a back piece 354 and a front piece 356 that cooperate to enclose an interior region 357 (shown at FIG. 6 where the back piece 354 has been removed from the front piece 356). A plurality of fiber optic adapters 358 are mounted to the front piece 356. The adapters 358 include exterior ports 360 that are accessible from the outside of the housing 352. In use, connectorized ends of drop cables can be inserted into the exterior ports 360 to connect the drop cables to the network. The exterior ports 360 are enclosed by plugs 362 when not connected to drop cables. The fiber optic adapters 358 also include interior ports 364 that are accessible from inside the housing 352. The interior ports 364 receive interior fiber optic connectors 366 (e.g., standard SC connectors as disclosed at U.S. Pat. No. 5,317,663, which is hereby incorporated by reference) that are mounted to the ends of fibers 371 corresponding to a fiber optic cable 367 (e.g., a branch cable from an F2 trunk) that is routed into the interior of the housing 352. At FIG. 8, for clarity, the routing paths for only two of the fibers 371 are shown. In practice, fibers 371 will be routed to each of the interior fiber optic connectors 366 of the drop terminal 104. The fibers 371 are optically coupled to corresponding fibers of the cable 367. For example, the fibers 371 can be integral continuations of the fibers of the cable 367 or can be spliced to the fibers of the cable 367. Further details about the drop terminal configuration can be found in U.S. patent application Ser. No. 12/248,564, now U.S. Patent Application Pub. No. 2009/0148118, and now U.S. Pat. No. 7,844,158, which is hereby incorporated by reference in its entirety.

Figure 9:
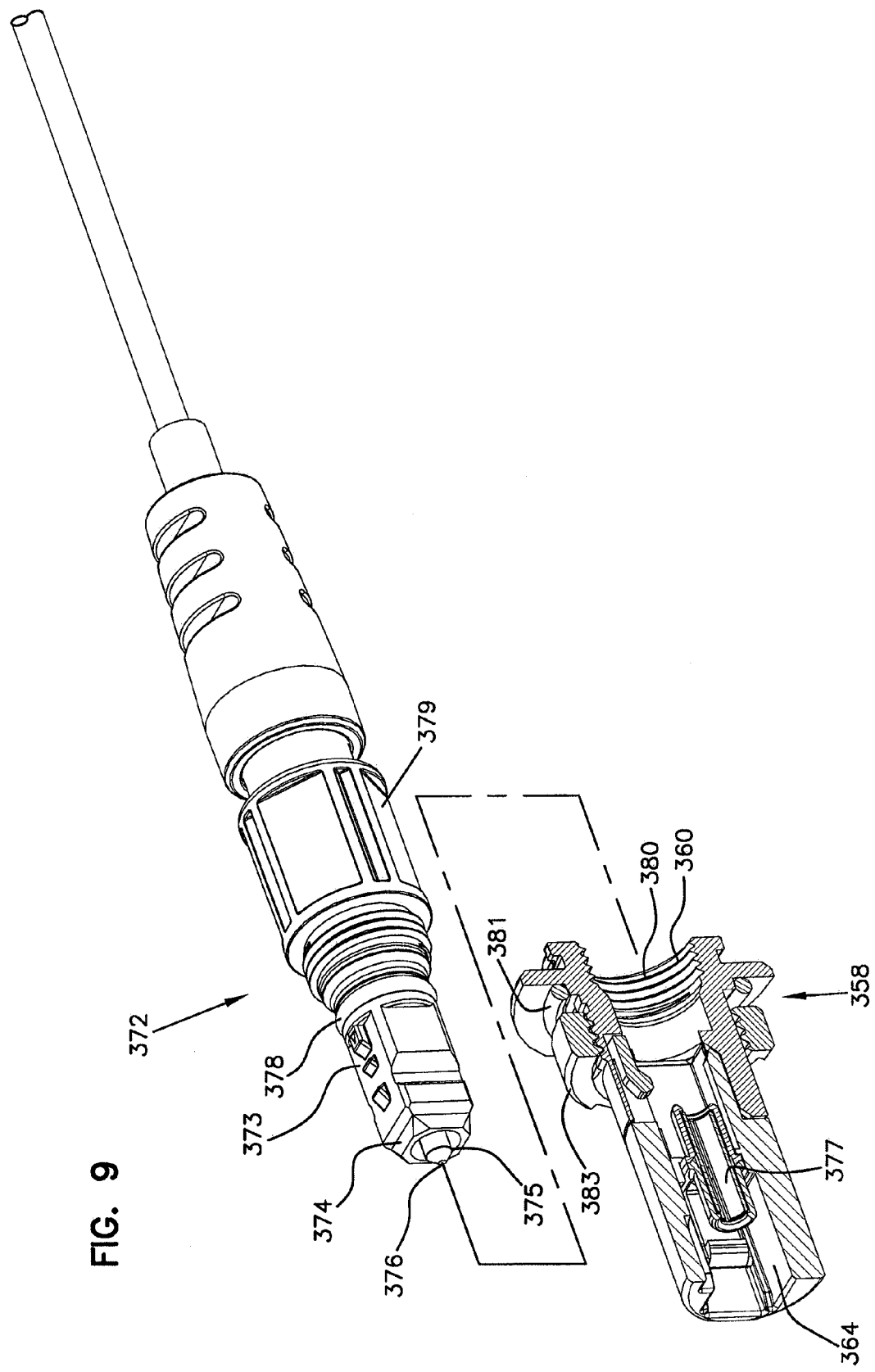
FIG. 9 is a perspective, partial cross-sectional view showing a fiber optic adapter and fiber optic connector that can be used with the drop terminal of FIG. 3.

FIG. 9 is a partial cross-sectional view showing one of the fiber optic adapters 358 and a corresponding exterior fiber optic connector 372 adapted to be received within the exterior port 360 of the adapter 358. The exterior fiber optic connector 372 includes a connector body 373 having a distal end portion 374 at which a ferrule 375 is mounted. The ferrule 375 supports an end portion of an optical fiber 376 of a cable (e.g., a drop cable) to which the fiber optic connector 372 is attached. When the connector body 373 is inserted within the exterior port 360, the ferrule 375 fits within an alignment sleeve 377 (e.g., a split sleeve) of the adapter 358. The alignment sleeve 377 also receives a ferrule of the interior connector 366 inserted within the interior port 364 of the fiber optic adapter 358. In this way, the alignment sleeve 377 provides alignment between the fiber 376 of the exterior fiber optic connector 372 and the fiber 371 of the interior fiber optic connector 366 thereby providing an optical connection that allows optical signals can be transferred between the fibers 376, 371. An o-ring 378 is mounted about the connector body 373 and forms an environmental seal between the connector body 373 and the fiber optic adapter 358 when the exterior fiber optic connector 372 is mounted within the exterior port 360. The exterior fiber optic connector 372 can be retained within the exterior port 360 by a threaded fastener 379 that threads into internal threads 380 defined within the exterior port 360. The fiber optic adapter 358 also includes a sealing member 381 (e.g., a o-ring) that provides an environmental seal between the exterior of the fiber optic adapter 358 and the front piece 356 of the drop terminal 104 when the adapter 358 is mounted within an opening defined by the front piece 356. A nut 383 can be used to secure the adapter 358 to the front piece 356 of the drop terminal 104. Further details of the fiber optic adapter 358 and the exterior fiber optic connector 372 are disclosed at U.S. patent application Ser. No. 12/203,508, now U.S. Pat. No. 7,744,288, which is hereby incorporated by reference.

Figure 10:
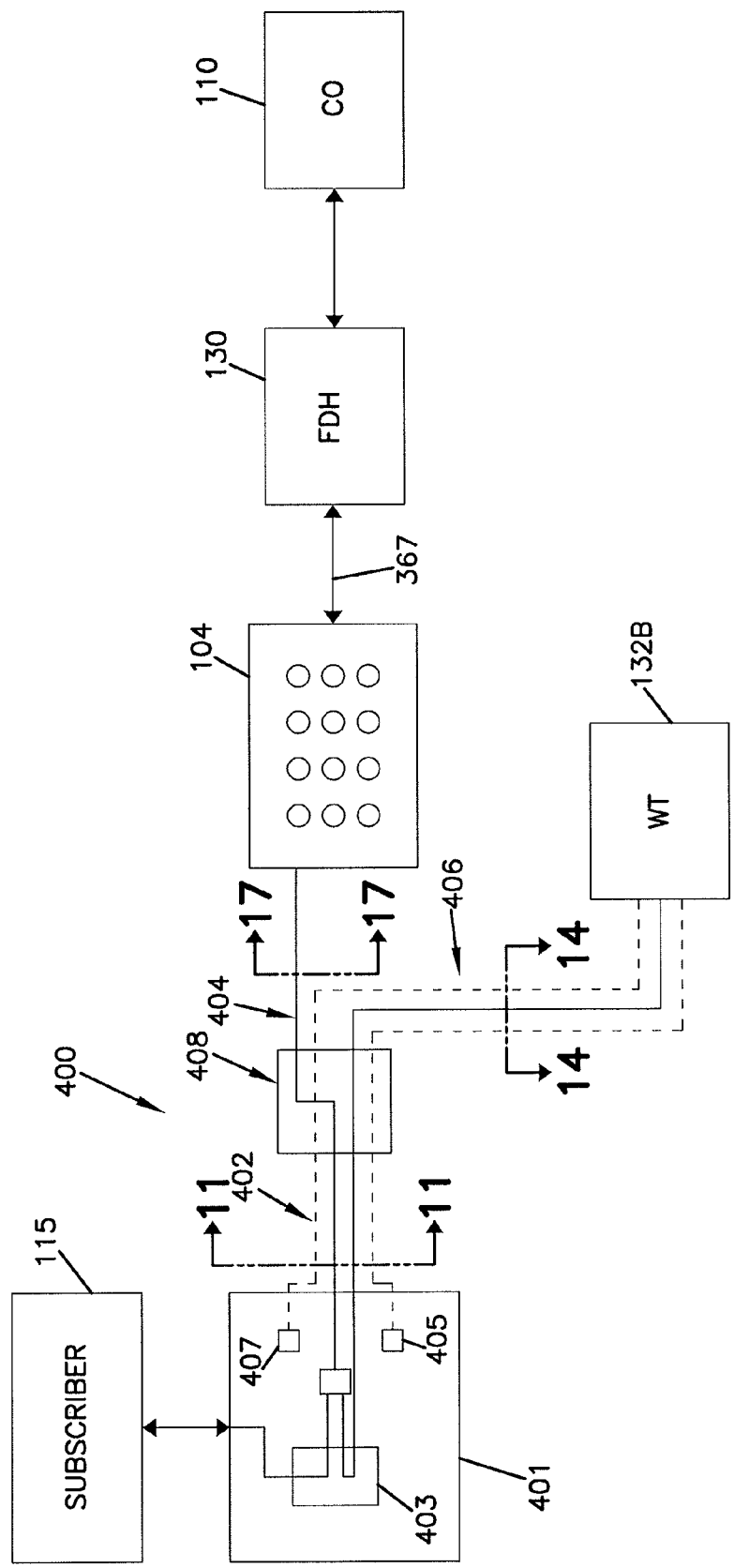
FIG. 10 is a schematic view of a first cable configuration between a drop terminal, a network interface device and a wireless transceiver.

D. Example Cabling Configurations for Providing Power to a Wireless Transceiver FIG. 10 shows an example cabling configuration 400 used to provide power and network connections to one of the wireless transmitters 132B of the network of FIG. 1. Generally, the cabling configuration 400 provides an optical signal feed from one of the drop terminals 104 to an ONT 401 positioned at the subscriber location 115. As described previously, the drop terminal 104 can be optically connected to one of the FDHs 130A (e.g., by an F2 distribution cable such as cable 367) which is optically connected to the central office 110. The ONT 401 includes a converter 403 that converts fiber optic signals to Ethernet signals and that converts Ethernet signals back to fiber optic signals. The ONT 401 also typically includes other signal processing equipment (e.g., a multi-plexer) in addition to the converter 403. In one embodiment, the optical signal feed is split before being converted at the converter 403. The split fiber optic signal feeds are converted to Ethernet signal feeds at the converter 403. One of the converted signal feeds is provided to the subscriber 115 while the other converted signal feed is back fed through the cabling configuration 400 to the wireless transceiver 132B. The cabling configuration 400 is also used to provide a power connection between a power source 405 at the ONT 401 and the wireless transceiver 132B. The cabling configuration 400 can also provide a ground connection between the wireless transceiver 132B and a ground location 407 at the ONT 401. In other embodiments, the Ethernet signal may be split. In still other embodiments, multiple fiber optic lines may be routed to the ONT 401 thereby eliminating the need for signal splitting.

The cabling configuration 400 includes a bifurcated cable having a trunk section 402 and two branch sections 404, 406. The branch sections 404, 406 are connected to the trunk section 402 at a furcation member 408. The trunk 402 is capable of transmitting twisted pair Ethernet signals and fiber optic signals. The trunk 402 also includes power and ground lines. The branch section 404 is adapted for carrying fiber optic signals. The branch section 406 is adapted for carrying twisted pair Ethernet signals and also includes power and ground lines.

FIGS. 11-13 show several different cable arrangements that can be used for the trunk section 402 of the cabling configuration 400. The views of FIGS. 11-13 are taken along cross section line 11-11 of FIG. 10. Referring to FIG. 11, cable arrangement 402A includes four twisted wire pairs 410. Each twisted wire pair 410 includes two wires that are twisted relative to one another about a common axis. Each of the wires includes a central conductor (e.g., a copper conductor) and an insulation layer surrounding the central conductor. In other embodiments, co-axial cable could be used in place of the twisted pair wires. Referring still to FIG. 11, the cable configuration 402A also includes an optical fiber 412, a dedicated power line 414 and a dedicated ground line 415. In one embodiment, the optical fiber can include a bend sensitive optical fiber having an outer diameter of about 250 microns. The optical fiber can be loosely or tightly buffered. In one embodiment, a tight buffer layer having an outer diameter of about 900 microns is provided over the optical fiber.

The power line 414 and ground line 415 are used to transfer power between the power source 405 and active components of the wireless transceiver 132B. The twisted wire pairs 410 are used to convey Ethernet signals between the ONT 401 and the wireless transmitter 132B. The optical fiber 412 is used to convey fiber optic signals between the drop terminal 104 and the ONT 401.

Referring still to FIG. 11, the cable arrangement 402A also includes a spacer 416 for separating the various wires/fibers of the cable arrangement. The spacer and the wires/fibers together form a core of the cable arrangement 402A. A strength layer 418 is positioned around the core. In one embodiment, the strength layer 418 includes tensile reinforcing members such as aramid yarn. The cable arrangement 402A also includes an outer jacket 420 that surrounds the strength layer 418.

The spacer 416 functions to position and maintain separation between the components forming the core of the cable configurations. For example, the depicted spacer 416 defines a plurality separate pockets for receiving components such as twisted wire pairs, fibers and power/ground lines. In other embodiments, cables in accordance with the principles of the present disclosure may include tape spacers (e.g., tape dividers/separators). In further embodiments, cable arrangements in accordance with the principles of the present disclosure may not use spacers.

The cable arrangement 402B of FIG. 12 is the same as the cable arrangement 402A of FIG. 11 except no dedicated power or ground lines are provided within the cable arrangement 402B. Instead, power is carried through the cable arrangement 402B along selected ones of the twisted wire pairs 410.

Similar to the cable arrangement 402B of FIG. 12, the cable arrangement 402C of FIG. 13 also includes four twisted wire pairs 410 and optical fiber 412. However, the cable arrangement 402C has a modified spacer 416' within which a central strength member 417 is located. The central strength member 417 preferably provides tensile reinforcement to the cable arrangement 402C. Also, it is preferred for the central strength member 417 to be made of an electrically conductive material. In one embodiment, the central strength member 417 is made of a metal material such as steel. The cable arrangement 402C also includes a conductive layer 419 that surrounds the inner cable core. The conductive layer 419 can include a braid of material such as aramid yarn and metal strands (e.g., copper strands). In other embodiments, the conductive layer 419 can be formed by a layer of conductive tape. In one embodiment, the central strength member 417 can be used as a power line for providing power to the wireless transceiver 132B and the conductive layer 419 can be used as a ground line. The outer jacket 420 surrounds the conductive layer 419.

Example cable arrangements 406A-406C for the branch section 406 are shown at FIGS. 14-16. The views of FIGS. 14-16 are taken along section line 14-14 of FIG. 10. The cable arrangement 406A is the same as the cable arrangement 402A of FIG. 11 except the optical fiber 412 is not present. Similarly, the cable arrangement 406B of FIG. 15 is the same as the cable arrangement 402B of FIG. 12 except the optical fiber 412 is not present. Further, the cable arrangement 406C of FIG. 16 is the same as the cable arrangement 402C of FIG. 13 except the optical fiber 412 is not present. The optical fiber 412 is not present in the cable arrangements 406A-406C of FIGS. 14-16 because the optical fiber 412 is broken out from the trunk section 402 and routed into the branch section 404 at the furcation member 408. Other than the fiber 412, the remainder of the trunk section 402 extends through the furcation member 408 to form the branch section 406. The branch section 404 preferably has an arrangement suitable for protecting the optical fiber 412. The optical fiber 412 can have a connectorized end (e.g., a connector such as the connector 372 of FIG. 9) that can be readily inserted into one of the exterior ports 360 of the drop terminal 104. By inserting the connectorized end into the exterior port 360, an optical connection is made between the optical fiber 412 and one of the optical fibers 371 (shown at FIG. 8) of the fiber optic cable 367 routed to the drop terminal 104.

FIGS. 17 and 18 show example cable arrangements 404A, 404B suitable for use as the branch section 404 of the cable configuration 400 of FIG. 10. In the cable arrangement 404A of FIG. 17, the optical fiber 412 is surrounded by a buffer layer (e.g., a tight buffer layer or a loose buffer tube) which in turn is surrounded by a strength layer 430. In one embodiment, the strength layer 430 provides tensile reinforcement to the cable arrangement 404A and can include a plurality of flexible reinforcing members such as aramid yarns. The strength layer 430 is surrounded by an outer jacket 440. The strength layer 430 can be anchored at one end of the branch section 404 to a connectorized end of the optical fiber 412 and can be anchored at the other end of the branch section 404 to the furcation member 408.

In the cable arrangement 404B of FIG. 18, the optical fiber 412 and buffer layer 413 are surrounded by an outer jacket 450 having a transverse cross section that is elongated along an axis 452. The optical fiber 412 is centered generally on the axis 452. Also, strength members 454 are positioned on the axis 452 on opposite sides of the optical fiber 412. The strength members 454 are embedded within the jacket 450 and are parallel to the optical fiber 412. The strength members 454 preferably provide tensile reinforcement to the cable arrangement 404B. In one embodiment, each of the strength members includes a rod formed by fiber glass reinforced epoxy. Similar to the strength layer 430 of the cable arrangement 404A of FIG. 12, the strength members 454 can be anchored at one end of the branch section 404 to the furcation member 408 and at the other end of the branch section 404 can be anchored to the connectorized end of the optical fiber 412.

Figure 19:
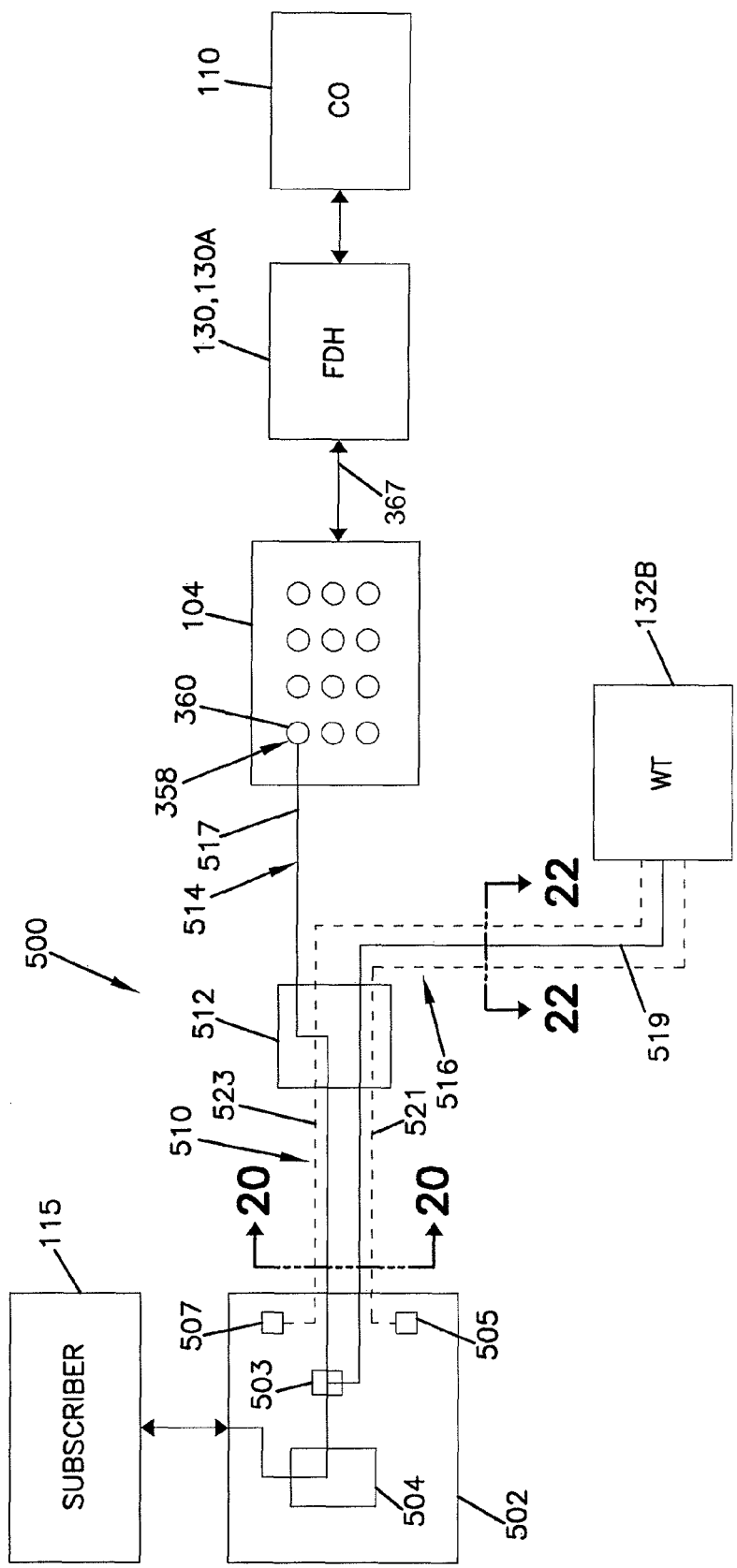
FIG. 19 shows a second cable configuration for providing an interconnection between a drop terminal, a network interface device and a wireless transceiver.

FIG. 19 depicts another cabling configuration 500 for back feeding telecommunications service and power from an ONT 502 to one of the wireless transceivers 132B of the network of FIG. 1. As shown at FIG. 19, distribution cable 367 is routed from FDH 130, 130A to one of the drop terminals 104. An optical signal provided to drop terminal 104 by the distribution cable 367 is directed from an exterior port 360 of one of the fiber optic adapters 358 of the drop terminal 104 through the cabling configuration 500 to the ONT 502. At the ONT 502, the optical signal is split at splitter 503. One output from the splitter 503 is directed to one or more components 504 of the ONT (e.g., an active component such as a converter and other equipment such as a multiplexer) and is then routed to the subscriber 115. The other output from the splitter 503 is back fed through the cabling configuration 500 to the wireless transceiver 132B. The cabling configuration 500 also electrically connects the wireless transceiver 132B to a power source 505 and a ground location 507 of the ONT 502.

The cabling configuration 500 includes a trunk section 510, a furcation member 512 and two branch sections 514, 516. The cabling configuration 500 includes a first optical transmission path 517 that extends from the drop terminal 104 through the branch section 514, the furcation member 512 and the trunk section 510 to the ONT 502. The cabling configuration 500 also includes a second optical transmission path 519 that extends from the wireless transceiver 132B through branch section 516, furcation member 512 and trunk section 510 to the ONT 502. The cabling configuration 500 further includes a power line 521 and a grounding line 523 that extend from the ONT 502 through the trunk section 510, the furcation member 512 and the branch section 516 to the wireless transceiver 132B.

FIGS. 20 and 21 show example cable arrangements 510A, 510B (i.e., cable assemblies) that can be used for the trunk section 510 of the cabling configuration 500. The views of the FIGS. 20 and 21 are taken along cross section line 20-20 of FIG. 19. The cable arrangement 510A includes optical fibers 520 positioned within a buffer tube 522. The buffer tube 522 is encased within an outer jacket 524. When viewed in transverse cross section, the outer jacket 524 is elongated along an axis 526. The buffer tube 522 is centered on the axis 526. The cable arrangement 510A also includes two strength members 528 aligned along the axis 526 on opposite sides of the buffer tube 522. The strength members 528 preferably provide tensile reinforcement to the cable arrangement 510A and are preferably generally parallel to the buffer tube 522. In a preferred embodiment, at least portions of the strength members 528 are electrically conductive. For example, in one embodiment, the strength members 528 have a metal construction such as steel. In another embodiment, the strength members 528 can include a steel construction with an outer conductive coating such as copper. In still other embodiments, the strength members 528 can include fiber glass reinforced epoxy rods that are coated with a conductive layer such as copper.

The cable arrangement 510B of FIG. 21 includes buffer tube 522 surrounding optical fibers 520. The cable configuration 510B also includes a strength layer 530 that surrounds the buffer tube 522 and provides tensile reinforcement to the cable arrangement 510B. In a preferred embodiment, the strength layer is formed by a plurality of aramid yarns. An outer jacket 532 surrounds the strength layer 530. Conductive members 533, 535 (e.g., conductive tape or other conductive members) are positioned inside the jacket 532.

FIGS. 22 and 23 show example cable arrangements 516A, 516B that can be used for the branch section 516 of the cabling configuration 500. The cable arrangement 516A of FIG. 22 is the same as the cable arrangement of 510A of FIG. 20 except one of the fibers 520 is not present. Similarly, the cable arrangement 516B of FIG. 23 is the same as the cable arrangement 510B of FIG. 121 except one of the fibers 520 is not present. By way of example, the branch section 514 can have a cable arrangement suitable for protecting an optical fiber such as the cable arrangements of FIGS. 17 and 18.

Generally, the cable arrangement forming the trunk section 510 extends from the ONT 502 through the furcation member 512 and then along the branch section 516. At the furcation member 512, one of the fibers 520 is broken out from the trunk section 510 and directed along branch section 514. Thus, one of the fibers 520 of the cabling configuration 500 extends from the ONT 502 along the trunk section 510, through the furcation 512, along the branch section 516 to the wireless transmitter 132B to provide the second optical path 519. The other optical fiber 520 extends from the ONT 502 along the trunk section 510, through the furcation member 512, along the branch 514 to the drop terminal 104 to form the first optical path 517. The branch 514 can be terminated by a connector (e.g., a connector such as the connector 372 of FIG. 9) that is inserted in the exterior port 360 of one of the fiber optic adapters 358 of the drop terminal 104 to provide an optical connection with the FDH and the central office 110. The reinforcing members 528 extend from the ONT 502 along the trunk section 510 through the furcation member 512, along the branch section 516 to the wireless transceiver 132B to form the power and grounding lines 521, 523 between the wireless transceiver 132B and the power source 505 and grounding location 507 at the ONT 502. Because the strength members 528 have electrically conductive properties, the strength members 528 can serve the dual function of reinforcing the cable assembly 500 and also providing a power connection between the ONT 502 and the wireless transceiver 132B.

Figure 24:
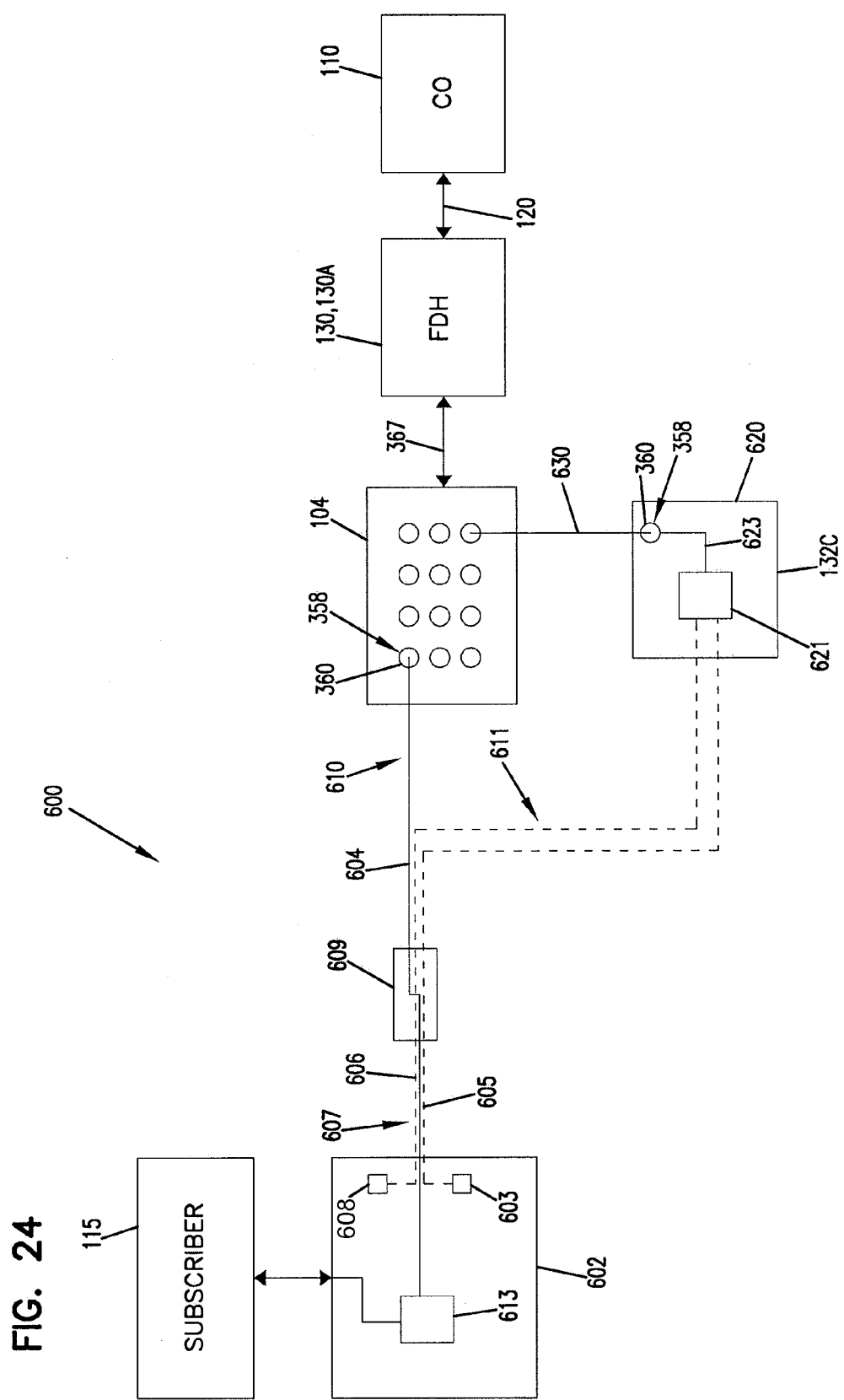
FIG. 24 is a third cable configuration for providing connections between a drop terminal, a network interface device and a wireless transceiver.

FIG. 24 shows a cabling configuration 600 for feeding power from an ONT 602 to a wireless transceiver 132C. The cabling configuration 600 includes an optical transmission path 604 that extends from the exterior ports 360 of one of the fiber optic adapters 358 of drop terminal 104 to the ONT 602. The cabling configuration 600 also includes a power line 605 and a grounding line 606 that extend from the ONT 602 to the wireless transceiver 132C. The optical transmission path 604 and the power and grounding lines 605, 606 are grouped together along a trunk section 607 of the cabling configuration 600. The optical transmission path 604 separates from the power and grounding lines 605, 606 at furcation member 609 such that the optical transmission path 604 extends along a first branch section 610 of the cabling configuration 600 and the power and grounding lines 605, 606 extend along a second branch section 611 of the cabling configuration 600. The optical transmission path 604 allows fiber optic telecommunications service to be provided to the subscriber 115 through the ONT 602. The branch section 610 can include a connectorized end (e.g., provided by a connector such as the connector 372 of FIG. 9) that is inserted in the exterior port 360 of one of the fiber optic adapters 358 of the drop terminal 104. As described previously, various active and passive components 613 can be provided within the ONT 602 for converting the optical signal to an Ethernet signal, and for providing multiplexing capabilities. The power line 605 is connected to a power source 603 located at the ONT 602 and the grounding line 606 is connected to a ground location 608 at the ONT 602.

Referring still to FIG. 24, the wireless transceiver 132C includes an outer housing 620 in which active transceiver components 621 of the transceiver are housed. At least one of the fiber optic adapters 358 is mounted to the outer housing 620. The exterior port 360 of the fiber optic adapter 358 is accessible from outside the housing 620 while the interior port 364 can receive the connectorized end of an optical fiber 623 routed from the fiber optic adapter 358 to the active transceiver component or components 621 within the housing 620 (e.g., transceiving equipment). A cable 630 is used to provide an optical transmission path between the drop terminal 104 and the wireless transceiver 132C. The cable 630 can include an optical fiber having connectorized ends inserted respectively in one of the exterior ports 360 of the drop terminal 104 and in the exterior port 360 of the wireless transceiver 132C. The connectorized ends of the cable can include connectors such as the connector 372 of FIG. 9. In this way, the wireless transceiver component 621 is placed in optical communication with the central office 110 via an optical transmission path that extends through fiber 623 to the cable 630, through the cable 630 to the drop terminal 104, through internal fibers 371 of the drop terminal to cable 367, through cable 367 to FDH 130, 130A, and through F2 cable 120 from FDH 130, 130A to the central office 110.

Figure 25:
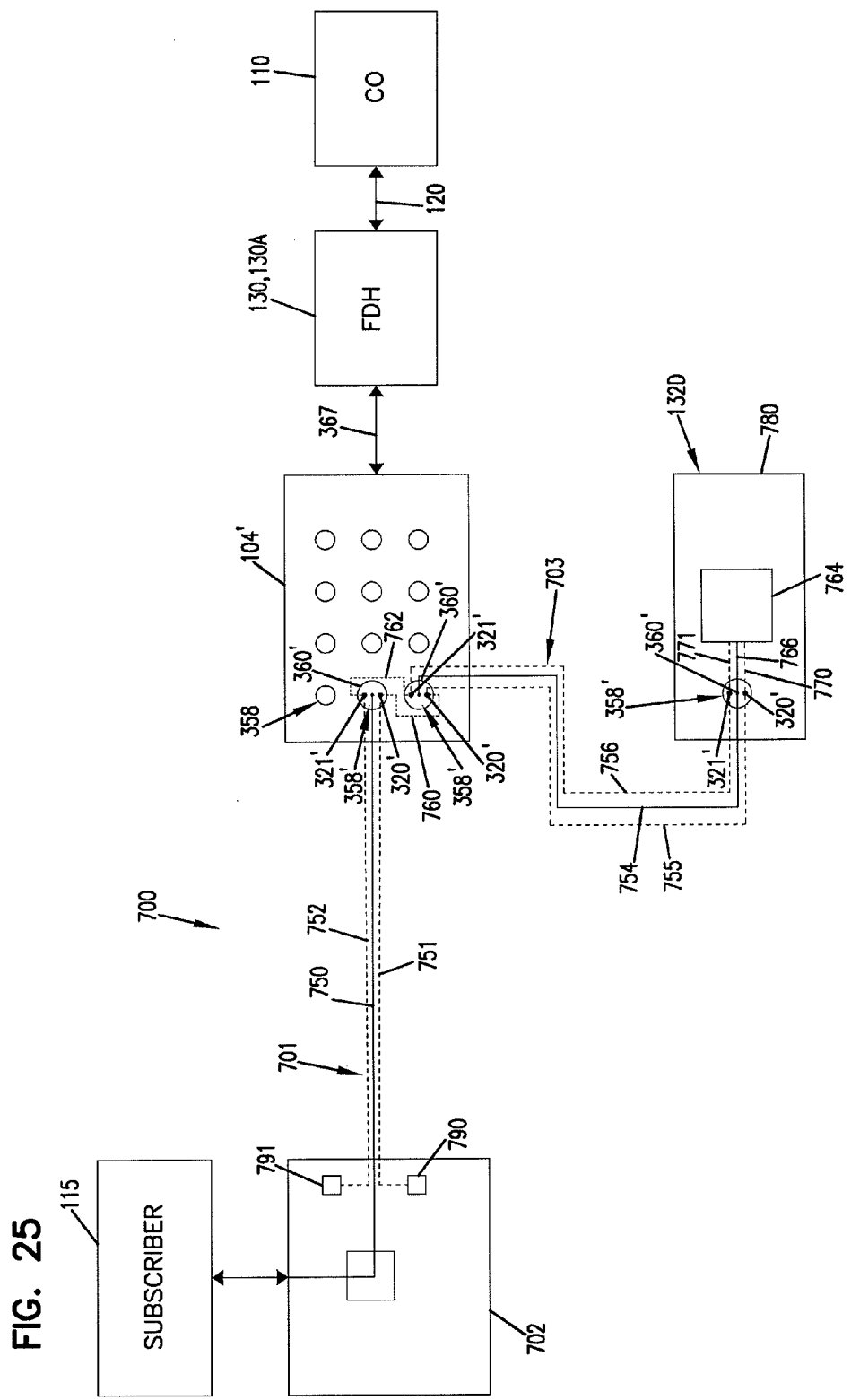
FIG. 25 is a schematic view showing a fourth cable configuration for providing connections between a drop terminal, a network interface device and a wireless transceiver.

FIG. 25 shows a cabling configuration 700 including a first cable 701 and a second cable 703. The first cable 701 provides an optical transmission path 750, a power line 751 and a grounding line 752 between an ONT 702 and a drop terminal 104'. The power and grounding lines 751, 752 are respectively connected to a power source 790 and a ground location 791 at the ONT 702. The second cable 703 provides an optical transmission path 754, a power line 755 and a grounding line 756 between the drop terminal 104' and a wireless transceiver 132D. The drop terminal 104' includes a plurality of the fiber optic adapters 358 mounted to an outer housing of the drop terminal 104'. The drop terminal 104' also includes a plurality of modified fiber optic adapters 358' (shown at FIG. 26) having interior ports 364' and exterior ports 360'. The fiber optic adapters 358' have the same configuration as the fiber optic adapter 358 shown at FIG. 9 except exterior ports 360' of the adapters 358' have been modified to include power contacts 320' and ground contacts 321'. The interior ports 364' receive internal fiber optic connectors corresponding to fibers of distribution cable 367 routed from the FDH 130, 130A to the drop terminal 104'.

Figure 26:
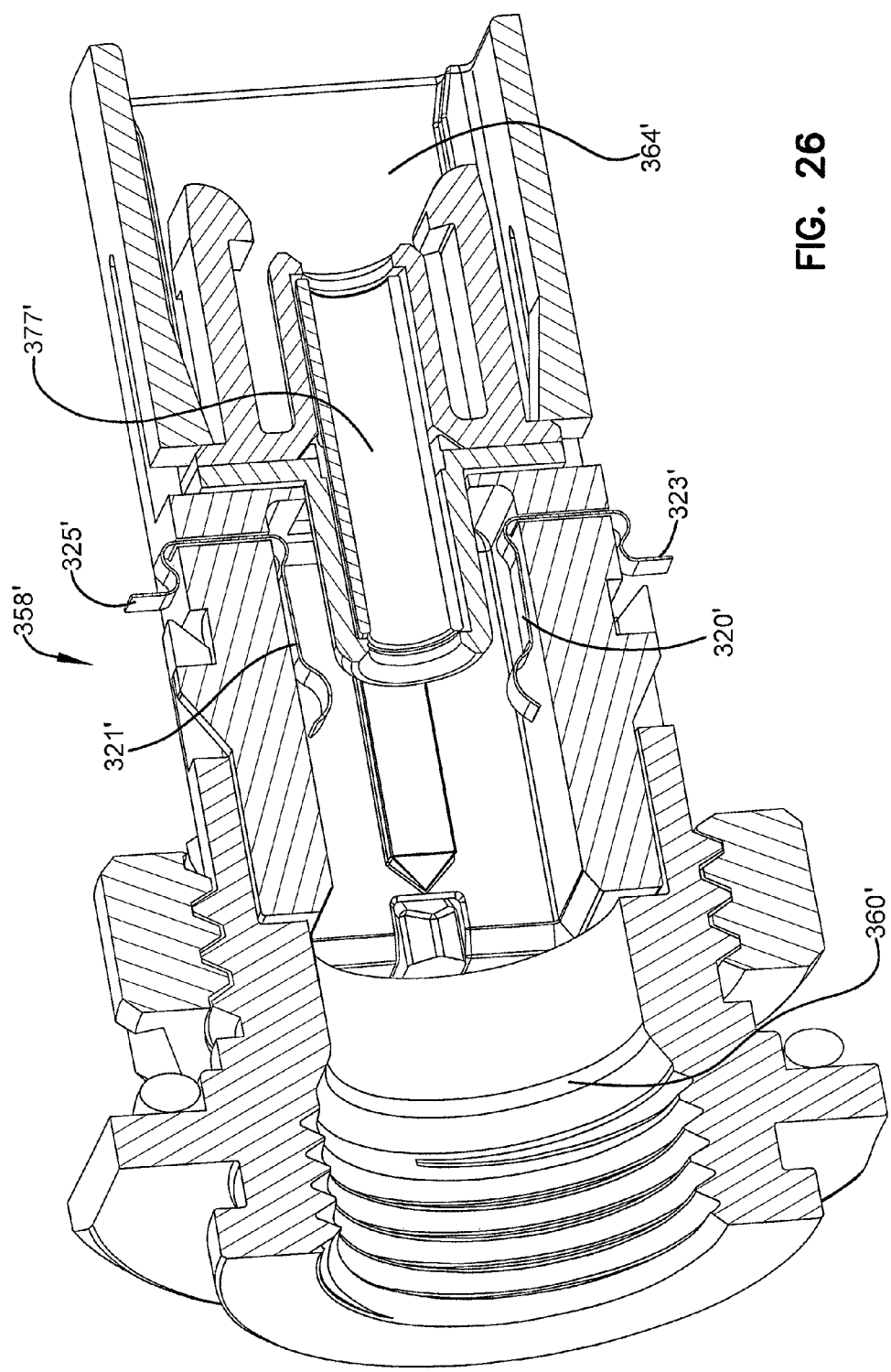
FIG. 26 is a cross-sectional view of an example fiber optic adapter that can be used on the drop terminal, the wireless transceiver and the network interface device of FIG. 25.

As shown at FIG. 26, the power contacts 320' and the ground contacts 321' are positioned at opposite sides of an alignment sleeve 377' of the fiber optic adapter 358'. As shown at FIG. 25, a first circuit path 760 is provided within the drop terminal 104' for electrically connecting the power contacts 320' of the fiber optic adapters 358'. The drop terminal 104' also includes a second circuit path 762 for electrically connecting the ground contacts 321' of the fiber optic adapters 358'. The contacts 320', 321' can respectively include exterior tabs 323', 325' for facilitating connecting the contacts 320', 321' to their respective circuit paths 760, 762. In one embodiment, the first and second circuit paths 760, 762 can be provided on a circuit board mounted within the drop terminal 104'.

Figure 27:
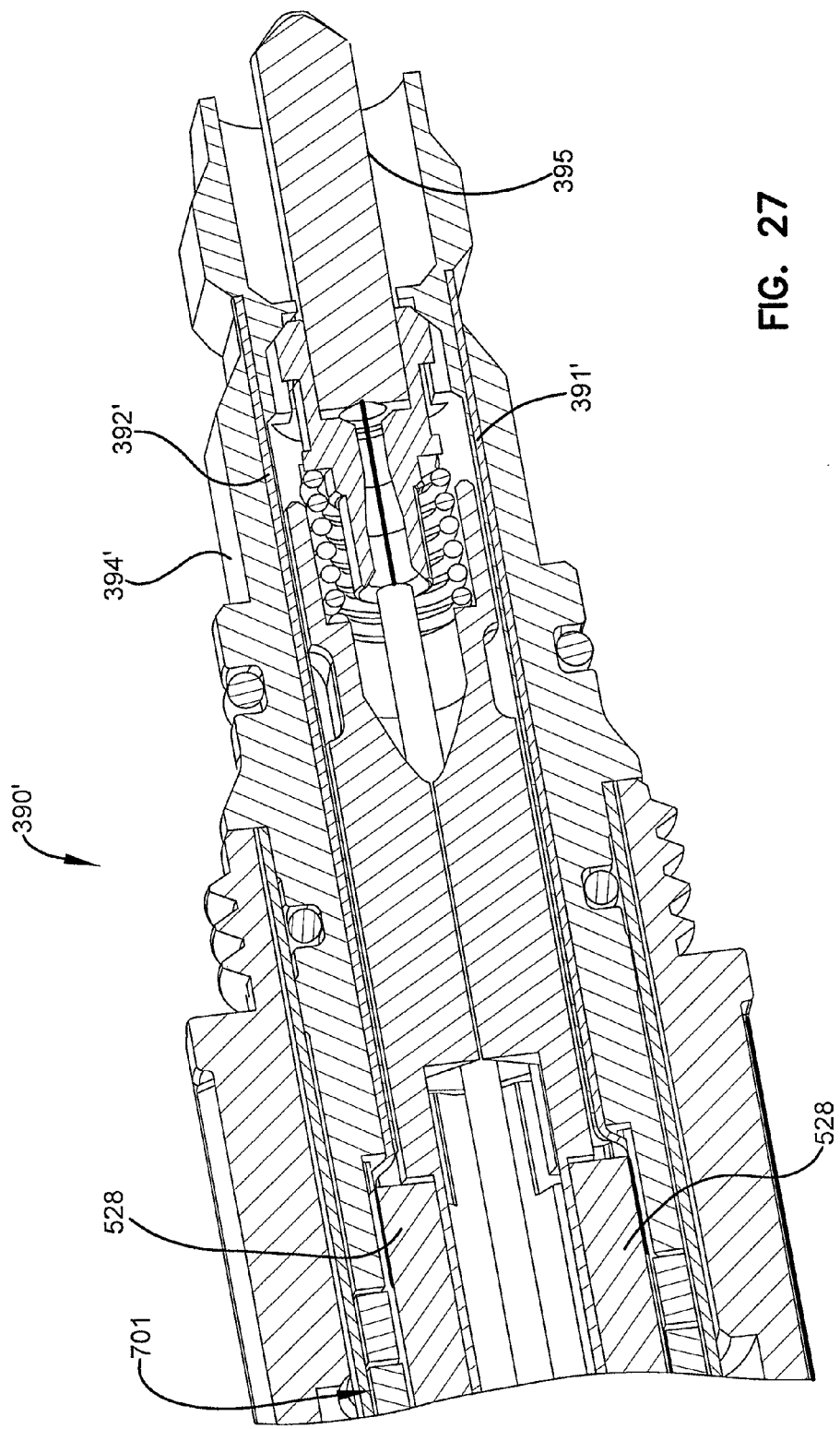
FIG. 27 is a cross-sectional view showing a ruggedized fiber optic connector that can be inserted in an exterior port of the fiber optic adapter of FIG. 26.

Referring to FIG. 27, an example connector 390' adapted to interface with the exterior ports 360' of the fiber optic adapters 358' is depicted. The connector 390' has substantially the same configuration as the connector 372 with the addition of a power lead 391' and a ground lead 392'. The connector 390' includes a connector body 394' supporting a ferrule 395. The power and ground leads 391', 392' are positioned on opposite sides of the ferrule 395. The connector 390' is shown connected to the end of the first cable 701. The first cable 701 is shown having the same configuration as the cable 516A of FIG. 22. The power lead 391' is electrically connected to one of the conductive strength members 528 of the cable 701 while the ground lead 392' is electrically connected to the other conductive strength member 528 of the cable 701. The conductive strength members 528 respectively electrically connect the power and ground leads 391', 392' to the power source 790 and grounding location 791 at the ONT 702.

When the connector 390' is inserted within one of the exterior ports 360', the ferrule 395 fits within the alignment sleeve 377', the power lead 391' engages the power contact 320' and the ground lead 392' engages the ground contact 321'. Thus, via the interface between the connector 390' and the adapter 358', the fiber within the cable 701 is optically connected to one of the optical fibers of the distribution cable 367 routed from the drop terminal 104' to the FDH 130, 130A. The interface between the connector 390' and the adapter 358' also provides an electrical connection between the power source 790 (which is electrically connected to the power lead 391') and the first circuit path 760. The first circuit path 760 provides power to the power contact 320' of the other adapter 358' of the drop terminal 104'. The interface between the connector 390' and the adapter 358' further provides an electrical connection between the ground location 791 (which is electrically connected to the ground lead 392') and the second circuit path 762. The second circuit path 762 grounds the ground contact 321' of the other adapters 358' of the drop terminal 104'. In other embodiments, more than two of the adapters 358' can be provided on the drop terminal 104' and linked to remote power and grounding locations.

The adapter 358' and connector 390' interface can also be used at other locations where it is desired to connect power/ground and a fiber optic line through the same connector arrangement. For example, the adapter 358' and the connector 390' can be used at the interface between the first cable 701 and the ONT 702 of FIG. 25. Also, the adapter 358' and the connector 390' can be used at the interface between the trunk section 607 and the ONT 602 of FIG. 24. Further, the adapter 358' and the connector 390' can be used at the interface between the wireless transceiver 132B and the branch section 516 of FIG. 19. Moreover, the adapter 358' and connector 390' can be modified to have a multi-fiber ferrule and alignment sleeve configuration and used at the interface between the trunk 510 and the ONT 502 of FIG. 19.

Referring again to FIG. 25, the wireless transceiver 132D includes at least one of the fiber optic adapters 358' mounted to an exterior wall of an outer enclosure/housing 780 of the wireless transceiver 132D. The power contact 320' and the ground contact 321' of the fiber optic adapter 358' are preferably electrically connected by circuit paths 770, 771 to active transceiver components 764 located within the housing 780 of the wireless transceiver 132D. An internal optical fiber 766 extends from the active transceiver components 764 to a fiber optic connector mounted within the interior port 364' of the fiber optic adapter 358'. The second cable 703 is used to provide an optical transmission path and a power transmission path between the drop terminal 104' and the wireless transceiver 132D. The second cable 703 can have the same configuration as the first cable 701 used to connect the drop terminal 104' to the ONT 702. For example, the cable 703 can have each end connectorized with one of the connectors 390' and can have a cable configuration of the type shown by the cable 516A of FIG. 22. The connectorized ends of the second cable 703 are preferably inserted within corresponding exterior ports 360' of the drop terminal 104' and the wireless transceiver 132D. When the second cable 703 is installed between the drop terminal 104' and the wireless transceiver 132D, the internal optical fiber 766 of the wireless transceiver 132D is optically connected to one of the fibers of the distribution cable 367 that extends from the drop terminal 104' to the FDH 130, 130A. Also, the active transceiver components 764 are electrically connected to the power source 790 and grounding location 791 of the ONT 702. Specifically, the grounding and power pathways extend through the first cable 701 from the ONT 702 to a first one of the adapters 358', through the circuit paths 760, 762 to a second one of the adapters 358', through the second cable 703 to the contacts 320', 321' of the adapter 358' on the wireless transceiver 132D, and then through the circuit paths 770, 771 to the active transceiver components 764.

Figure 28:
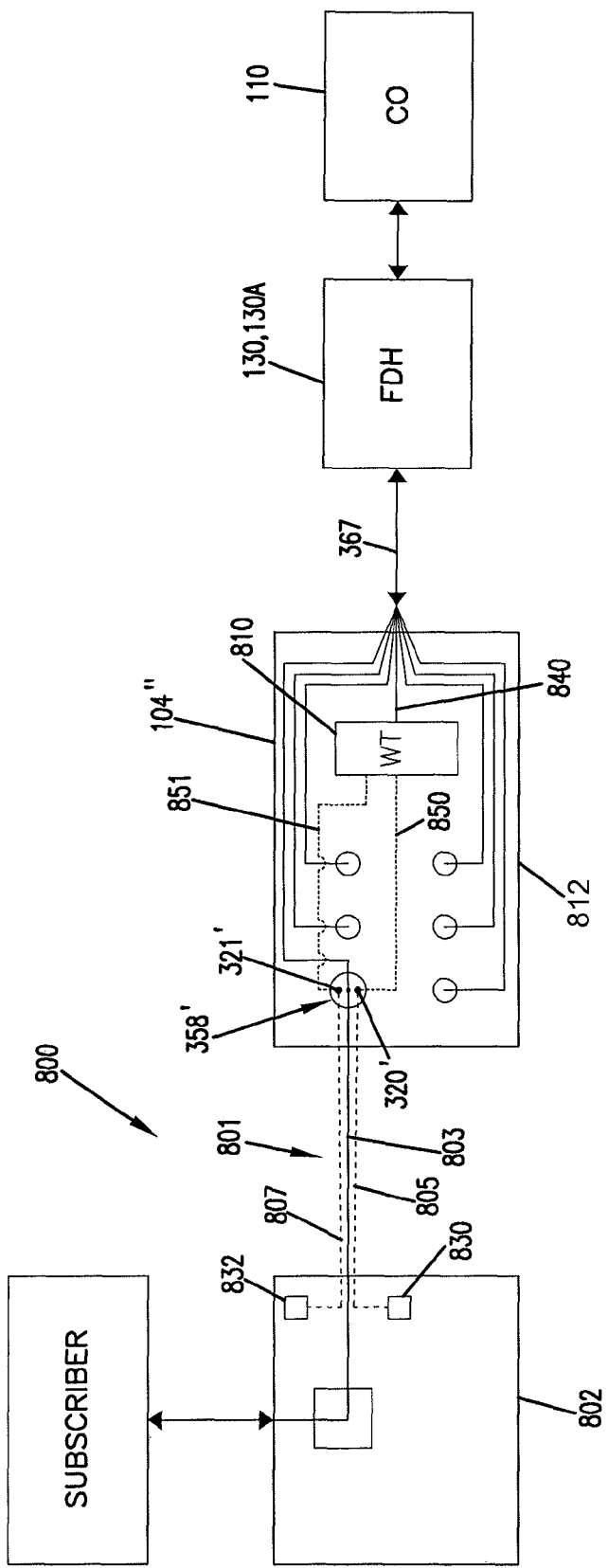
FIG. 28 is a schematic view of a fifth cable configuration for interconnecting a drop terminal, a wireless transceiver and a network interface device.

FIG. 28 shows a cabling system 800 having a cable 801 that provides an optical transmission line 803, a power transmission line 805 and a ground line 807 between an ONT 802 and a drop terminal 104". The cable 801 can have the same configuration as the first cable 701 of FIG. 25 and can include connectorized ends including connectors 390' that interface with adapters 358' provided at the ONT 802 and at the drop terminal 104". The power and ground contacts 320', 321' of the adapter 358' at the ONT 802 can be respectively connected to a power source 830 and a ground location 832.

The drop terminal 104" has the same configuration as the drop terminal 104' except an active wireless transceiver component 810 is mounted within an outer housing 812 of the drop terminal 104". One or more optical fibers from distribution cable 367 routed from the FDH 130, 130A to the drop terminal 104" are optically coupled to the wireless transceiver component 810 within the drop terminal 104" by one or more internal optical fibers 840. In this way, one or more fiber optic signals can be routed to the wireless transceiver component 810 from the FDH 130, 130A. Optical fibers of the distribution cable 367 are also linked to interior connectors mounted within the interior ports 364' of the fiber optic adapters 358'. Furthermore, the wireless transceiver component 810 is electrically connected to power and ground contacts 320', 321' of the adapter 358' of the drop terminal 104" by circuit paths 850, 851. Grounding and power pathways extend through the cable 801 from the ONT 802 to the adapters 358' on the drop terminal 104", and then from the adapter 358' through the circuit paths 850, 851 to the wireless transceiver component 810.

In certain embodiments, cabling configurations in accordance with the present disclosure may include cables that provide power to a wireless transceiver or other wireless device without providing separate grounding lines (e.g., the wireless device may be grounded through other means).

From the forgoing detailed description, it will be evident that modifications and variations can be made without departing from the spirit and scope of the disclosure.

What is claimed is:

1. A fiber optic network configuration comprising:
   an optical network terminal located at a subscriber location;
   a drop terminal located outside the subscriber location;
   a wireless transceiver located outside the subscriber location; and
   a cabling arrangement including a first signal line that extends from the drop terminal to the optical network terminal, a second signal line that extends from the optical network terminal to the wireless transceiver, and a power line that extends from the optical network terminal to the wireless transceiver;
   wherein the power line feeds electrical power from the optical network terminal to the wireless transceiver;
   wherein the first and second signal lines are optical signal lines; and
   wherein an optical signal is conveyed from the drop terminal to the optical network terminal through the first signal line, wherein the optical signal is split at the optical network terminal to provide a split optical signal, and wherein the split optical signal is backfed from the optical network terminal to the wireless transceiver through the second signal line.

2. A fiber optic network configuration comprising:
   an optical network terminal located at a subscriber location;
   a drop terminal located outside the subscriber location;
   a wireless transceiver located outside the subscriber location; and
   a cabling arrangement including a first signal line that extends from the drop terminal to the optical network terminal, a second signal line that extends from the optical network terminal to the wireless transceiver, and a power line that extends from the optical network terminal to the wireless transceiver;
   wherein the power line feeds electrical power from the optical network terminal to the wireless transceiver; and
   wherein an optical signal is conveyed from the drop terminal to the optical network terminal through the first signal line, wherein the optical signal is converted to an electrical signal at the optical network terminal, and wherein the electrical signal is backfed from the optical network terminal to the wireless transceiver through the second signal line.

3. A fiber optic network configuration comprising:
   an optical network terminal located at a subscriber location;
   a drop terminal located outside the subscriber location;
   a wireless transceiver located outside the subscriber location; and
   a cabling arrangement including a first signal line that extends from the drop terminal to the optical network terminal, a second signal line that extends from the optical network terminal to the wireless transceiver, and a power line that extends from the optical network terminal to the wireless transceiver;
   wherein the power line feeds electrical power from the optical network terminal to the wireless transceiver; and
   wherein the cabling arrangement includes a bifurcated cable including a trunk section, a first branch section and a second branch section.

4. The fiber optic network configuration of claim 3, wherein the first signal line is an optical signal line and wherein the second signal line is an electrical signal line.

5. The fiber optic network configuration of claim 3, wherein the first signal line extends through the first branch section and the trunk section, and wherein the second signal line extends through the second branch section and the trunk section.

6. The fiber optic network configuration of claim 5, wherein the first signal line includes an optical fiber and the second signal line includes twisted wire pairs.

7. The fiber optic network configuration of claim 6, wherein the power line is also defined by the twisted wire pairs.

8. The fiber optic network configuration of claim 7, wherein the power line includes a dedicated power line separate from the twisted wire pairs that extends through the second branch section and the trunk section.

9. The fiber optic network configuration of claim 6, wherein the first and second signal lines include optical fibers, and wherein the power line extends through the second branch section and the trunk section.

10. A fiber optic network configuration comprising:
    an optical network terminal located at a subscriber location;
    a drop terminal located outside the subscriber location;
    a wireless transceiver located outside the subscriber location; and
    a cabling arrangement including a first optical signal line that extends from the drop terminal to the optical network terminal, a second optical signal line that extends from the drop terminal to the wireless transceiver, and a power line that extends from the optical network terminal to the wireless transceiver;
    wherein the power line feeds electrical power from the optical network terminal to the wireless transceiver; and
    wherein the cabling arrangement includes a bifurcated cable including a first branch section, a second branch section and a trunk section, wherein the first optical signal line extends through the first branch section and the trunk section, and wherein the power line extends through the second branch section and the trunk section.

11. A fiber optic network configuration comprising:
    an optical network terminal located at a subscriber location;
    a drop terminal located outside the subscriber location, the drop terminal including first and second fiber optic adapters mounted to an enclosure of the drop terminal, the first and second fiber optic adapters including external ports;
    a wireless transceiver located outside the subscriber location, the wireless transceiver including a third fiber optic adapter mounted to an enclosure of the wireless transceiver, the third fiber optic adapter including an internal port and an external port, the wireless transceiver including a wireless transceiver component positioned within the enclosure of the wireless transceiver, the wireless transceiver including an internal fiber optically connected to the wireless transceiver component, the internal fiber having a fiber optic connector inserted within the internal port of the third fiber optic adapter; and a cabling arrangement including a first optical signal line that extends from the external port of the first fiber optic adapter to the optical network terminal, a second optical signal line that extends from the external port of the second fiber optic adapter to the external port of the third fiber optic adapter, and a power line that extends from the optical network terminal to the wireless transceiver.

12. A fiber optic network configuration comprising:

an optical network terminal located at a subscriber location;

a drop terminal located outside the subscriber location, the drop terminal including first and second fiber optic adapters mounted to an enclosure of the drop terminal, the first and second fiber optic adapters including external ports having power contacts, the power contacts of the first and second fiber optic adapters being electrically connected to one another;

a wireless transceiver located outside the subscriber location, the wireless transceiver including a third fiber optic adapter mounted to an enclosure of the wireless transceiver, the third fiber optic adapter including an internal port and an external port, the external port of the third fiber optic adapter including a power contact electrically connected to a wireless transceiver component positioned within the enclosure of the wireless transceiver, the wireless transceiver including an internal fiber optically connected to the wireless transceiver component, the internal fiber having a fiber optic connector inserted within the internal port of the third fiber optic adapter; and a cabling arrangement including a first optical signal line that extends from the external port of the first fiber optic adapter to the optical network terminal, a second optical signal line that extends from the external port of the second fiber optic adapter to the external port of the third fiber optic adapter, a first power line that extends from the optical network terminal to the power contact of the first adapter, and a second power line that extends from the power contact of the second fiber optic adapter to the power contact of the third fiber optic adapter.

13. The fiber optic network configuration of claim 12, wherein the first optical signal line and the first power line are incorporated into a first cable, and the second optical signal line and the second power line are incorporated into a second cable.

14. A fiber optic network configuration comprising:

an optical network terminal located at a subscriber location;

a drop terminal located outside the subscriber location, the drop terminal including a plurality of fiber optic adapters mounted to an enclosure of the drop terminal, the fiber optic adapters including internal ports and external ports, at least one of the external ports having a power contact, and the drop terminal including a plurality of interior connectors inserted within the internal ports of the fiber optic adapters;

a wireless transceiver located within the enclosure of the drop terminal, the wireless transceiver being electrically connected to the power contact;

a cabling arrangement including a first optical signal line that extends from the external port of one of the fiber optic adapters having the power contact to the optical network terminal, the cabling arrangement also including a power line that extends from the optical network terminal to the power contact; and a distribution cable routed to the drop terminal, the distribution cable including optical fibers corresponding to the interior connectors and also including at least one optical fiber corresponding to the wireless transceiver.

\* \* \* \* \*

UNITED STATES PATENT AND TRADEMARK OFFICE
CERTIFICATE OF CORRECTION

PATENT NO. : 8,532,490 B2
APPLICATION NO. : 12/718818
DATED : September 10, 2013
INVENTOR(S) : Smith et al.

Page 1 of 1

It is certified that error appears in the above-identified patent and that said Letters Patent is hereby corrected as shown below:

In the Claims:

Col. 16, line 23, claim 8: "claim 7," should read --claim 6,--

Col. 16, line 27, claim 9: "claim 6," should read --claim 5,--

Signed and Sealed this
Twelfth Day of May, 2015

Michelle K. Lee
*Director of the United States Patent and Trademark Office*